(12) United States Patent
Kato et al.

(10) Patent No.: US 9,494,789 B2
(45) Date of Patent: Nov. 15, 2016

(54) COLORED COMPOSITION FOR ELECTROWETTING DISPLAY, IMAGE DISPLAY STRUCTURE, AND ELECTROWETTING DISPLAY DEVICE

(71) Applicant: FUJIFILM CORPORATION, Minato-ku, Tokyo (JP)

(72) Inventors: Takashi Kato, Kangawa (JP); Satoshi Higuchi, Kangawa (JP); Yuuichi Fukushige, Kanagawa (JP); Yoshihiro Jimbo, Kangawa (JP); Daisuke Sasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 273 days.

(21) Appl. No.: 14/085,795

(22) Filed: Nov. 21, 2013

(65) Prior Publication Data

US 2014/0078572 A1 Mar. 20, 2014

Related U.S. Application Data

(63) Continuation of application No. PCT/JP2012/064294, filed on Jun. 1, 2012.

(30) Foreign Application Priority Data

Jun. 10, 2011 (JP) .................................. 2011-130602
May 30, 2012 (JP) .................................. 2012-123414

(51) Int. Cl.
*G02B 26/00* (2006.01)
*G02B 26/02* (2006.01)
(Continued)

(52) U.S. Cl.
CPC ............. *G02B 26/005* (2013.01); *C09B 23/04* (2013.01); *C09B 57/10* (2013.01)

(58) Field of Classification Search
CPC .. G02B 26/004; G02B 26/005; C09B 23/04; C09B 57/00; C09B 57/10; C09B 47/0673; C09B 47/0675; C09B 47/0676; C09B 47/0678; C09B 63/005; C09B 69/109; C07D 207/34; C07D 207/46; C07D 403/06; G03C 1/735; C09D 11/328
USPC ........ 548/402, 403, 530, 539, 540; 359/290, 359/291, 296, 297, 315, 316, 318, 320, 321, 359/228; 430/7; 525/719; 252/586
See application file for complete search history.

(56) References Cited

U.S. PATENT DOCUMENTS

2008/0076044 A1\* 3/2008 Mizukawa ......... C07D 207/335
430/7
2008/0225374 A1 9/2008 Hayes et al.
(Continued)

FOREIGN PATENT DOCUMENTS

JP 2007-531917 A \* 11/2007
JP 2008-292970 A 12/2008
WO 2009/063880 A1 5/2009

OTHER PUBLICATIONS

International Search Report issued in International Application No. PCT/JP2012/064294 on Aug. 21, 2012.
(Continued)

*Primary Examiner* — Bumsuk Won
*Assistant Examiner* — Collin X Beatty
(74) *Attorney, Agent, or Firm* — Solaris Intellectual Property Group, PLLC

(57) ABSTRACT

A colored composition for use in electrowetting displays includes a non-polar solvent and a dipyrromethene dye having a solubility in n-hexane of 1% by mass or higher at 25° C. and 0.1 MPa. In a particular embodiment, an electrowetting display device that employs the colored composition exhibits increased responsiveness, and exhibits suppressed backflow at the time of image display.

10 Claims, 2 Drawing Sheets

(51) Int. Cl.
*C09B 23/04* (2006.01)
*C09B 57/10* (2006.01)

(56) References Cited

U.S. PATENT DOCUMENTS

| | | | |
|---|---|---|---|
| 2010/0055582 A1* | 3/2010 | Mizukawa | C07D 207/46 430/7 |
| 2010/0081071 A1* | 4/2010 | Ito | G03F 7/105 430/7 |
| 2010/0230647 A1 | 9/2010 | Mizukawa et al. | |
| 2010/0292450 A1 | 11/2010 | Shiga et al. | |
| 2010/0296150 A1 | 11/2010 | Hayes et al. | |
| 2011/0217636 A1* | 9/2011 | Kanna | C07D 207/335 430/7 |
| 2012/0264039 A1* | 10/2012 | Ito | C09B 57/10 430/7 |

OTHER PUBLICATIONS

Written Opinion of the ISA issued in International Application No. PCT/JP2012/064294 on Aug. 21, 2012.
Japanese Office Action dated Nov. 11, 2014, issued in corresponding Japanese Patent Application.
Hayes, Robert et al., "Video-speed electronic paper based on electrowetting," Nature, vol. 425, Sep. 2003, pp. 383-385, Nature Publishing Group (UK).

* cited by examiner

COLORED COMPOSITION FOR ELECTROWETTING DISPLAY, IMAGE DISPLAY STRUCTURE, AND ELECTROWETTING DISPLAY DEVICE

CROSS-REFERENCE TO RELATED APPLICATION

This application is a continuation application of International Application No. PCT/JP2012/064294, filed Jun. 1, 2012, the disclosure of which is incorporated herein by reference in its entirety. Further, this application claims priority from Japanese Patent Application No. 2011-130602, filed Jun. 10, 2011, and Japanese Patent Application No. 2012-123414, filed May 30, 2012, the disclosures of which are incorporated herein by reference in their entirety.

BACKGROUND OF THE INVENTION

1. Field of the Invention

The present invention relates to a colored composition for use in electrowetting displays, an image display structure and an electrowetting display device.

2. Description of the Related Art

In recent years, many organic dyes have been used in display materials, optical recording media, inkjet recording material, etc. In a case in which a dye is used in a coating process or an inkjet recording process, the dye is required to have a high molar absorption coefficient as well as high solubility in solvents in order to increase coloring efficiency.

Since a display utilizing an electrowetting method (EWD) has been reported in Nature (London), 425, 383 (2003), electrowetting displays have attracted attention as a new image display technology. Electrowetting displays employ an image forming method in which plural pixels filled with two phases formed by a hydrophilic medium and an oil-based color ink are arranged on a substrate, affinity for the hydrophilic medium interface or the oil-based color ink interface is controlled by on-off control of voltage application for each pixel, and image is displayed by spreading the oil-based color ink over the substrate/shrinking the oil-based color ink. Dyes for use in such electrowetting displays are required to have high solubility in hydrocarbon solvents.

Examples of known dyes for use in color filters (display materials) include various dipyrromethene metal complex compounds such as the following compounds (for example, see Japanese Patent Application Laid-Open (JP-A) No. 20089-292970)

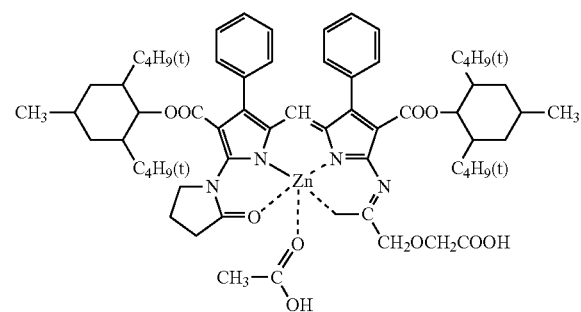

I-22

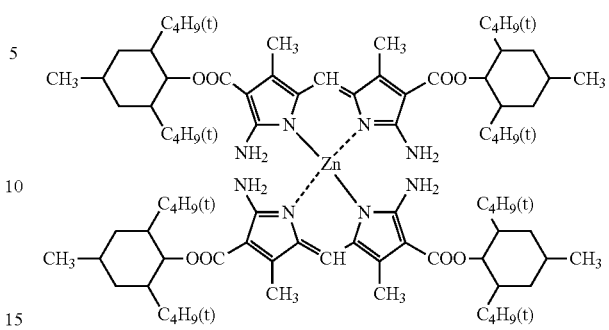

I-30

SUMMARY OF THE INVENTION

However, the conventional dyes specifically described in JP-A No. 2008-292970 have low solubility in non-polar solvents, particularly in hydrocarbon solvents. Accordingly, further improvement has been required.

The present invention aims to provide a colored composition for use in electrowetting displays that includes a violet dye (a dipyrromethene dye) having favorable solubility in non-polar solvents, particularly in hydrocarbon solvents, and has a high color optical density.

The present invention also aims to provide an image display structure and an electrowetting display device having a high color optical density in which a backflow phenomenon is suppressed.

<1> A colored composition for use in electrowetting displays, the colored composition including:

a dipyrromethene dye having a solubility in n-hexane of 1% by mass or higher at 25° C. and 0.1 MPa; and a non-polar solvent.

<2> The colored composition according to <1>, in which the dipyrromethene dye is a metal complex compound in which a dipyrromethene compound represented by the following Formula (I) is coordinated to a metal or a metal compound:

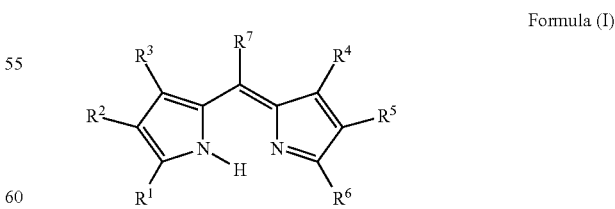

Formula (I)

wherein, in Formula (I), each of $R^1$, $R^2$, $R^3$, $R^4$, $R^5$, and $R^6$ independently represents a hydrogen atom or a monovalent substituent; and $R^7$ represents a hydrogen atom, a halogen atom, an alkyl group, an aryl group, or a heterocyclic group.

<3> The colored composition according to <2>, in which the dipyrromethene metal complex compound is a compound represented by the following Formula (I-3):

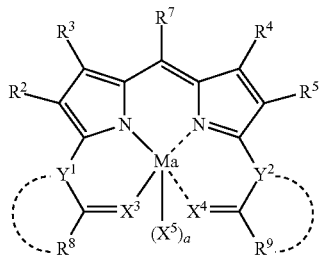

Formula (I-3)

wherein, in Formula (I-3), each of $R^2$, $R^3$, $R^4$, and $R^5$ independently represents a hydrogen atom or a monovalent substituent; $R^7$ represents a hydrogen atom, a halogen atom, an alkyl group, an aryl group, or a heterocyclic group; each of $R^8$ and $R^9$ independently represents an alkyl group, an alkenyl group, an aryl group, a heterocyclic group, an alkoxy group, an aryloxy group, an alkylamino group, an arylamino group, or a heterocyclic amino group; Ma represents a metal atom or a metal compound; each of $X^3$ and $X^4$ independently represents NRa (wherein Ra represents a hydrogen atom, an alkyl group, an alkenyl group, an aryl group, a heterocyclic group, an acyl group, an alkylsulfonyl group, or an arylsulfonyl group), a nitrogen atom, an oxygen atom, or a sulfur atom; each of $Y^1$ and $Y^2$ independently represents NRb (wherein Rb represents a hydrogen atom, an alkyl group, an alkenyl group, an aryl group, a heterocyclic group, an acyl group, an alkylsulfonyl group, or an arylsulfonyl group), a nitrogen atom, an oxygen atom, a sulfur atom, or a carbon atom; $X^5$ represents a group that can be bonded to Ma; "a" represents 1 or 2; $R^8$ and $Y^1$ may be linked to each other to form a 5-, 6-, or 7-membered ring; and $R^9$ and $Y^2$ may be linked to each other to form a 5-, 6-, or 7-membered ring.

<4> The colored composition according to <3>, in which at least one selected from the group consisting of $R^2$, $R^3$, $R^4$, $R^5$, $R^8$, and $R^9$ in Formula (I-3) represents a linear or branched alkyl group having from 1 to 20 carbon atoms.

<5> The colored composition according to <3> or <4>, in which $X^5$ in Formula (I-3) represents a group that neutralizes an electric charge of Ma, the group containing a linear or branched alkyl group having from 1 to 20 carbon atoms.

<6> The colored composition according to any one of <3> to <5>, in which $X^5$ in Formula (I-3) represents a linear or branched alkyl ester group having from 1 to 20 carbon atoms.

<7> An image display structure including:
a hydrophobic insulating film layer having a hydrophobic surface;
an oil layer arranged so as to contact the hydrophobic surface and formed using a non-conductive oil including the colored composition according to any one of <1> to <6>; and
a hydrophilic liquid layer arranged so as to contact the oil layer.

<8> An electrowetting display device including a display unit, the display unit including:
a first substrate, at least part of at least one surface of the first substrate being electrically conductive;
a second substrate disposed so as to face the electrically conductive surface of the first substrate;
a hydrophobic insulating film disposed on at least part of a surface of the first substrate at a side at which the electrically conductive surface is disposed;
a non-conductive oil disposed between the hydrophobic insulating film and the second substrate such that the non-conductive oil is movable on the hydrophobic insulating film, the non-conductive oil including a colored composition for use in electrowetting displays, and the colored composition including a non-polar solvent and a dipyrromethene dye having a solubility in n-hexane of 1% by mass or higher at 25° C. and 0.1 MPa; and
an electrically conductive hydrophilic liquid disposed between the hydrophobic insulating film and the second substrate such that the hydrophilic liquid contacts the non-conductive oil,
in which an image is formed by changing a shape of an interface between the non-conductive oil and the hydrophilic liquid by the application of a voltage between the hydrophilic liquid and the electrically conductive surface of the first substrate.

<9> The electrowetting display device according to <8>, in which the dipyrromethene dye is a metal complex compound in which a dipyrromethene compound represented by the following Formula (I) is coordinated to a metal or a metal compound:

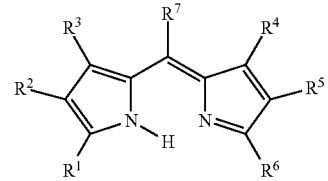

Formula (I)

wherein, in Formula (I), each of $R^1$, $R^2$, $R^3$, $R^4$, $R^5$, and $R^6$ independently represents a hydrogen atom or a monovalent substituent; and $R^7$ represents a hydrogen atom, a halogen atom, an alkyl group, an aryl group, or a heterocyclic group.

<10> The electrowetting display device according to <9>, in which the dipyrromethene metal complex compound is a compound represented by the following Formula (I-3):

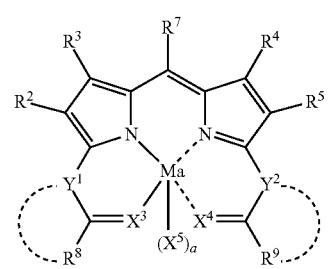

Formula (I-3)

wherein, in Formula (I-3), each of $R^2$, $R^3$, $R^4$, and $R^5$ independently represents a hydrogen atom or a monovalent substituent; $R^7$ represents a hydrogen atom, a halogen atom, an alkyl group, an aryl group, or a heterocyclic group; each of $R^8$ and $R^9$ independently represents an alkyl group, an alkenyl group, an aryl group, a heterocyclic group, an alkoxy group, an aryloxy group, an alkylamino group, an arylamino group, or a heterocyclic amino group; Ma represents a metal atom or a metal compound; each of $X^3$ and $X^4$ independently represents NRa (wherein Ra represents a hydrogen atom, an alkyl group, an alkenyl group, an aryl group, a heterocyclic group, an acyl group, an alkylsulfonyl group, or an arylsulfonyl group), a nitrogen atom, an oxygen atom, or a sulfur atom; each of $Y^1$ and $Y^2$ independently represents NRb (wherein Rb represents a hydrogen atom, an alkyl group, an alkenyl group, an aryl group, a heterocyclic group, an acyl group, an alkylsulfonyl group, or an arylsulfonyl group), a nitrogen atom, an oxygen atom, a sulfur atom, or a carbon atom; $X^5$ represents a group that can be bonded to Ma; "a" represents 1 or 2; $R^8$ and $Y^1$ may be linked to each other to form a 5-, 6-, or 7-membered ring; and $R^9$ and $Y^2$ may be linked to each other to form a 5-, 6-, or 7-membered ring.

<11> The electrowetting display device according to <10>, in which at least one selected from the group consisting of $R^2$, $R^3$, $R^4$, $R^5$, $R^8$, and $R^9$ in Formula (I-3) represents a linear or branched alkyl group having from 1 to 20 carbon atoms.

<12> The electrowetting display device according to <10> or <11>, in which $X^5$ in Formula (I-3) represents a group that neutralizes an electric charge of Ma, the group containing a linear or branched alkyl group having from 1 to 20 carbon atoms.

<13> The electrowetting display device according to any one of <10> to <12>, in which $X^5$ in Formula (I-3) represents a linear or branched alkyl ester group having from 1 to 20 carbon atoms.

According to the invention, it is possible to provide a colored composition that contains a violet dye (a dipyrromethene dye) having favorable solubility in non-polar solvents, particularly in hydrocarbon solvents, and has a high color optical density.

According to the invention, it is also possible to provide an image display structure and an electrowetting display device having a high color optical density in which a backflow phenomenon is suppressed.

The dipyrromethene dye according to the invention having favorable solubility in non-polar solvents, particularly in hydrocarbon solvents, is useful for displays etc., particularly, for display devices that operate on the principle of electrowetting.

DETAILED DESCRIPTION OF THE INVENTION

Figure 1:
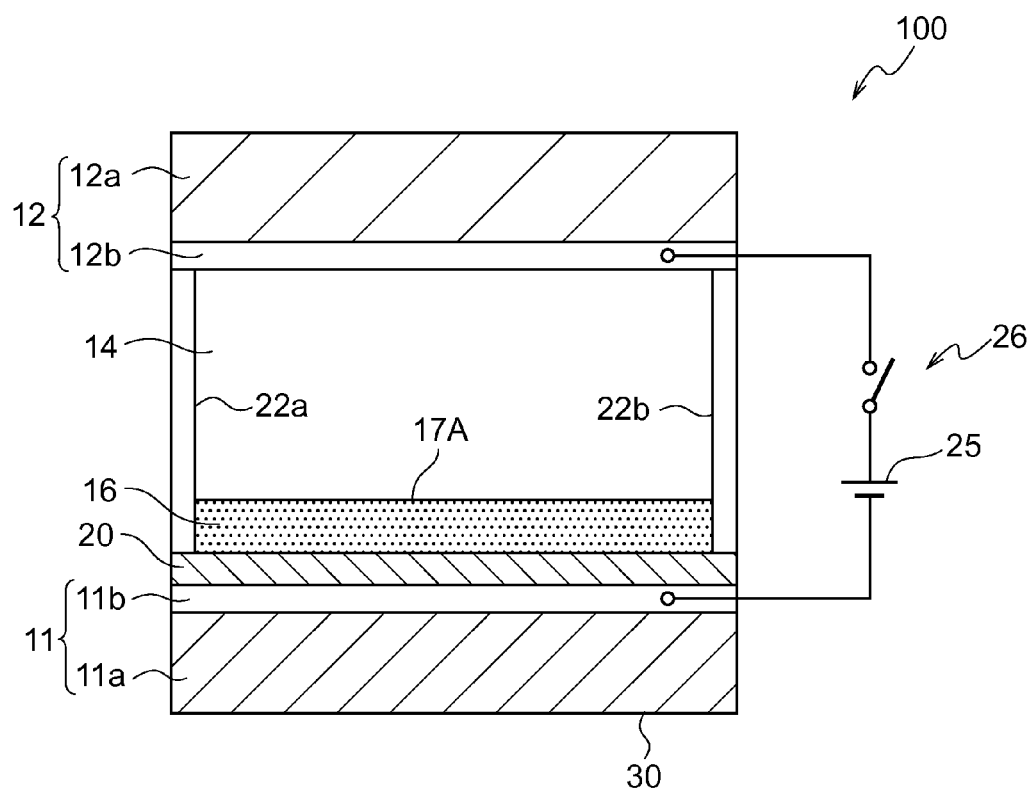
FIG. 1 is a schematic cross-sectional view showing an electrowetting display device according to an embodiment of the invention in a non-voltage applied state.

Colored Composition for Use in Electrowetting Displays

A colored composition for use in electrowetting displays of the invention includes a non-polar solvent and a dipyrromethene dye having a solubility in n-hexane of 1% by mass or higher at 25° C. and 0.1 MPa.

Hereinafter, the dipyrromethene dye having a solubility in n-hexane of 1% by mass or higher at 25° C. and 0.1 MPa is sometimes referred to as "dipyrromethene dye according to the invention". In addition, the colored composition for use in electrowetting displays is sometimes simply referred to as "colored composition".

The colored composition of the invention may include only one dipyrromethene dye according to the invention, or may include two or more of the dipyrromethene dyes according to the invention. In a case in which the colored composition includes two or more dipyrromethene dyes, the ratio therebetween may be set to any ration.

The dipyrromethene dye according to the invention may be the only dye contained in the colored composition of the invention. Alternatively, the colored composition of the invention may include a dye other than the dipyrromethene dye according to the invention in order to obtain intended hue. For example, the dipyrromethene dye according to the invention may be mixed with a red dye and a blue dye to form a black composition.

Dipyrromethene Dye

The dipyrromethene dye according to the invention has a solubility in n-hexane of 1% by mass or higher at 25° C. and 0.1 MPa.

A dye having a solubility in n-hexane of 1% by mass or higher at 25° C. and 0.1 MPa is useful for displays etc., particularly, for display devices that operate on the principle of electrowetting or displays that operate via electrophoresis.

Hereinafter, a dipyrromethene compound represented by the following Formula (I) is sometimes referred to as "specific compound". In addition, a metal complex compound in which the dipyrromethene compound represented by Formula (I) is coordinated to a metal or a metal compound is sometimes referred to as "specific metal complex compound".

The colored composition of the invention including the dipyrromethene dye according to the invention has a high color optical density, and therefore can suppress a backflow phenomenon when used in electrowetting displays. In particular, in a case in which the specific metal complex compound containing the metal is used as the dipyrromethene dye, the backflow phenomenon can be effectively suppressed.

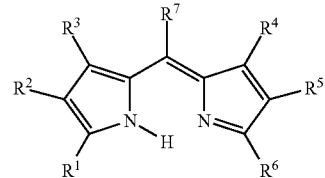

Formula (I)

In Formula (I), each of $R^1$, $R^2$, $R^3$, $R^4$, $R^5$, and $R^6$ independently represents a hydrogen atom or a monovalent substituent; and $R^7$ represents a hydrogen atom, a halogen atom, an alkyl group, an aryl group, or a heterocyclic group.

Examples of the monovalent substituent include a halogen atom (such as a fluorine atom, a chlorine atom, or a bromine atom), an alkyl group (a linear, branched, or cyclic alkyl group having preferably from 1 to 48, more preferably from 1 to 24 carbon atoms, such as a methyl group, an ethyl group, a propyl group, an isopropyl group, a butyl group, a t-butyl group, a pentyl group, a hexyl group, a heptyl group, an octyl group, a 2-ethylhexyl group, a dodecyl group, a hexadecyl group, a cyclopropyl group, a cyclopentyl group, a cyclohexyl group, a 1-norbornyl group, or a 1-adamantyl group; preferably a linear or branched alkyl group having from 6 to 24 carbon atoms), an alkenyl group (an alkenyl group having preferably from 2 to 48, more preferably from 2 to 18 carbon atoms, such as a vinyl group, an allyl group, or a 3-buten-1-yl group), an aryl group (an aryl group having preferably from 6 to 48, more preferably from 6 to 24 carbon atoms, such as a phenyl group or a naphthyl group), a heterocyclic group (a heterocyclic group having preferably from 1 to 32, more preferably from 1 to 18 carbon atoms, such as a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, or a benzotriazol-1-yl group), a silyl group (a silyl group having preferably from 3 to 38, more preferably from 3 to 18 carbon atoms, such as a trimethylsilyl group, a triethylsilyl group, a tributylsilyl group, a t-butyldimethylsilyl group, or a t-hexyldimethylsilyl group), a hydroxy group, a cyano group, a nitro group, an alkoxy group (an alkoxy group having preferably from 1 to 48, more preferably from 1 to 24 carbon atoms, for example, a methoxy group, an ethoxy group, a 1-butoxy group, a 2-butoxy group, an isopropoxy group, a t-butoxy group, a dodecyloxy group, or a cycloalkyloxy group, such as a cyclopentyloxy group or a cyclohexyloxy group), an aryloxy group (an aryloxy group having preferably from 6 to 48, more preferably from 6 to 24 carbon atoms, such as a phenoxy group or a 1-naphthoxy group), a heterocyclic oxy group (a heterocyclic oxy group having preferably from 1 to 32, more preferably from 1 to 18 carbon atoms, such as a 1-phenyltetrazole-5-oxy group or a 2-tetrahydropyranyloxy group), a silyloxy group (a silyloxy group having preferably from 1 to 32, more preferably from 1 to 18 carbon atoms, such as a trimethylsilyloxy group, a t-butyldimethylsilyloxy group, or a diphenylmethylsilyloxy group), an acyloxy group (an acyloxy group having preferably from 2 to 48, more preferably from 2 to 24 carbon atoms, such as an acetoxy group, a pivaloyloxy group, a benzoyloxy group, or a dodecanoyloxy group), an alkoxycarbonyloxy group (an alkoxycarbonyloxy group having preferably from 2 to 48, more preferably from 2 to 24 carbon atoms, for example, an ethoxycarbonyloxy group, a t-butoxycarbonyloxy group, or a cycloalkyloxycarbonyloxy group, such as a cyclohexyloxycarbonyloxy group), an aryloxycarbonyloxy group (an aryloxycarbonyloxy group having preferably from 7 to 32, more preferably from 7 to 24 carbon atoms, such as a phenoxycarbonyloxy group), a carbamoyloxy group (a carbamoyloxy group having preferably from 1 to 48, more preferably from 1 to 24 carbon atoms, such as an N,N-dimethylcarbamoyloxy group, an N-butylcarbamoyloxy group, an N-phenylcarbamoyloxy group, or an N-ethyl-N-phenylcarbamoyloxy group), a sulfamoyloxy group (a sulfamoyloxy group including preferably from 1 to 32, more preferably from 1 to 24 carbon atoms, such as an N,N-diethylsulfamoyloxy group or an N-propylsulfamoyloxy group), an alkylsulfonyloxy group (an alkylsulfonyloxy group having preferably from 1 to 38, more preferably from 1 to 24 carbon atoms, such as a methylsulfonyloxy group, a hexadecylsulfonyloxy group, or a cyclohexylsulfonyloxy group), an arylsulfonyloxy group (an arylsulfonyloxy group having preferably from 6 to 32, more preferably from 6 to 24 carbon atoms, such as a phenylsulfonyloxy group), an acyl group (an acyl group having preferably from 1 to 48, more preferably from 1 to 24 carbon atoms, such as a formyl group, an acetyl group, a pivaloyl group, a benzoyl group, a tetradecanoyl group, or a cyclohexanoyl group), an alkoxycarbonyl group (an alkoxycarbonyl group having preferably from 2 to 48, more preferably from 2 to 24 carbon atoms, such as a methoxycarbonyl group, an ethoxycarbonyl group, an octadecyloxycarbonyl group, a cyclohexyloxycarbonyl group, or a 2,6-di-tert-butyl-4-methylcyclohexyloxycarbonyl group), an aryloxycarbonyl group (an aryloxycarbonyl group having preferably from 7 to 32, more preferably from 7 to 24 carbon atoms, such as a phenoxycarbonyl group), a carbamoyl group (a carbamoyl group having preferably from 1 to 48, more preferably from 1 to 24 carbon atoms, such as a carbamoyl group, an N,N-diethylcarbamoyl group, an N-ethyl-N-octylcarbamoyl group, an N,N-dibutylcarbamoyl group, an N-propylcarbamoyl group, an N-phenylcarbamoyl group, a N-methyl-N-phenylcarbamoyl group, or an N,N-dicyclohexylcarbamoyl group), an amino group (an amino group having preferably 32 or less, more preferably 24 or less carbon atoms, such as an amino group, a methylamino group, an N,N-dibutylamino group, a tetradecylamino group, a 2-ethylhexylamino group, or a cyclohexylamino group), an anilino group (an anilino group having preferably from 6 to 32, more preferably from 6 to 24 carbon atoms, such as an anilino group or an N-methylanilino group), a heterocyclic amino group (a heterocyclic amino group having preferably from 1 to 32, more preferably from 1 to 18 carbon atoms, such as a 4-pyridylamino group), a carbonamido group (a carbonamido group having preferably from 2 to 48, more preferably from 2 to 24 carbon atoms, such as an acetamido group, a benzamido group, a tetradecanamido group, a pivaloylamido group, or a cyclohexanamido group), an ureido group (an ureido group having preferably from 1 to 32, more preferably from 1 to 24 carbon atoms, such as an ureido group, an N,N-dimethylureido group, or an N-phenylureido group), an imido group (an imido group having preferably 36 or less, more preferably 24 or less carbon atoms, such as an N-succinimido group or an N-phthalimido group), an alkoxycarbonylamino group (an alkoxycarbonylamino group having preferably from 2 to 48, more preferably from 2 to 24 carbon atoms, such as a methoxycarbonylamino group, an ethoxycarbonylamino group, a t-butoxycarbonylamino group, an octadecyloxycarbonylamino group, or a cyclohexyloxycarbonylamino group), an aryloxycarbonylamino group (an aryloxycarbonylamino group having preferably from 7 to 32, more preferably from 7 to 24 carbon atoms, such as an phenoxycarbonylamino group), a sulfonamido group (a sulfonamido group having preferably from 1 to 48, more preferably from 1 to 24 carbon atoms, such as a methanesulfonamido group, a butanesulfonamido group, a benzenesulfonamido group, a hexadecanesulfonamido group, or a cyclohexanesulfonamido group), a sulfamoylamino group (a sulfamoylamino group having preferably from 1 to 48, more preferably from 1 to 24 carbon atoms, such as an N,N-dipropylsulfamoylamino group or an N-ethyl-N-dodecylsulfamoylamino group), an azo group (an azo group having preferably from 1 to 32, more preferably from 1 to 24 carbon atoms, such as a phenylazo group or a 3-pyrazolylazo group), an alkylthio group (an alkylthio group having preferably from 1 to 48, more preferably from 1 to 24 carbon atoms, such as a methylthio group, an ethylthio group, an octylthio group, or a cyclohexylthio group), an arylthio group (an arylthio group having preferably from 6 to 48, more preferably from 6 to 24 carbon atoms, such as a phenylthio group), a heterocyclic thio group (a heterocyclic thio group having preferably from 1 to 32, more preferably from 1 to 18 carbon atoms, such as a 2-benzothiazolylthio group, a 2-pyridylthio group, or a 1-phenyltetrazolylthio group), an alkylsulfinyl group (an alkylsulfinyl group having preferably from 1 to 32, more preferably from 1 to 24 carbon atoms, such as a dodecanesulfinyl group), an arylsulfinyl group (an arylsulfinyl group having preferably from 6 to 32, more preferably from 6 to 24 carbon atoms, such as a phenylsulfinyl group), an alkylsulfonyl group (an alkylsulfonyl group having preferably from 1 to 48, more preferably from 1 to 24 carbon atoms, such as a methylsulfonyl group, an ethylsulfonyl group, a propylsulfonyl group, a butylsulfonyl group, an isopropylsulfonyl group, a 2-ethylhexylsulfonyl group, a hexadecylsulfonyl group, an octylsulfonyl group, or a cyclohexylsulfonyl group), an arylsulfonyl group (an arylsulfonyl group having preferably from 6 to 48, more preferably from 6 to 24 carbon atoms, such as a phenylsulfonyl group or a 1-naphthylsulfonyl group), a sulfamoyl group (a sulfamoyl group having preferably 32 or less, more preferably 24 or less carbon atoms, such as a sulfamoyl group, an N,N-dipropylsulfamoyl group, an N-ethyl-N-dodecylsulfamoyl group, an N-ethyl-N-phenylsulfamoyl group, or an N-cyclohexylsulfamoyl group), a sulfo group, a phosphonyl group (a phosphonyl group having preferably from 1 to 32, more preferably from 1 to 24 carbon atoms, such as a phenoxyphosphonyl group, an octyloxyphosphonyl group, or a phenylphosphonyl group) and a phosphinoylamino group (a phosphinoylamino group having preferably from 1 to 32, more preferably from 1 to 24 carbon atoms, such as a diethoxyphosphinoylamino group or an dioctyloxyphosphinoylamino group).

When the above-mentioned monovalent substituent is a group that may further be substituted, it may further be substituted by any of the above-mentioned groups. When the substituent group has two or more substituents, these substituents may be the same as or different from one another.

In Formula (I), each of $R^1$ and $R^2$, $R^2$ and $R^3$, $R^4$ and $R^5$, and $R^5$ and $R^6$ may be independently linked to each other to form a 5-, 6- or 7-membered ring. The 5-, 6-, or 7-membered ring may be a saturated or unsaturated ring. Examples of the 5-, 6-, or 7-membered saturated or unsaturated ring include unsubstituted 5-, 6-, or 7-membered saturated or unsaturated rings include a pyrrole ring, a furan ring, a thiophene ring, a pyrazole ring, an imidazole ring, a triazole ring, an oxazole ring, a thiazole ring, a pyrrolidine ring, a piperidine ring, a cyclopentene ring, a cyclohexene ring, a benzene ring, a pyridine ring, a pyrazine ring or a pyridazine ring. Among these, a benzene ring and a pyridine ring are preferable.

When the 5-, 6-, or 7-membered saturated or unsaturated ring is a group that may further be substituted, it may further be substituted by any of the above-mentioned monovalent substituents represented by $R^1$ to $R^6$. When the 5-, 6-, or 7-membered saturated or unsaturated ring has two or more substituents, these substituents may be the same as or different from one another.

The halogen atom, the alkyl group, the aryl group and the heterocyclic group represented by $R^7$ in Formula (I) have the same definitions as the alkyl group, the aryl group and the heterocyclic group represented by $R^1$ to $R^6$ above, respectively, and have the same preferable definitions as the alkyl group, the aryl group and the heterocyclic group represented by $R^1$ to $R^6$ above.

In Formula (I), it is preferable that each of $R^1$ and $R^6$ independently represents an alkylamino group, an arylamino group, a carbonamido group, a ureido group, an imido group, an alkoxycarbonylamino group, or a sulfonamido group; it is more preferable that each of $R^1$ and $R^6$ independently represents a carbonamido group, a ureido group, an alkoxycarbonylamino group, or a sulfonamido group; it is still more preferable that each of $R^1$ and $R^6$ independently represents a carbonamido group, a ureido group, an alkoxycarbonylamino group, or a sulfonamido group; and it is yet more preferable that each of $R^1$ and $R^6$ independently represents a carbonamido group or a ureido group.

In Formula (I), it is preferable that each of $R^2$ and $R^5$ independently represents an alkoxycarbonyl group, an aryloxycarbonyl group, a carbamoyl group, an alkylsulfonyl group, an arylsulfonyl group, a nitrile group, an imido group, or a carbamoylsulfonyl group; it is more preferable that each of $R^2$ and $R^5$ independently represents an alkoxycarbonyl group, an aryloxycarbonyl group, a carbamoyl group, an alkylsulfonyl group, a nitrile group, an imido group, or a carbamoylsulfonyl group; it is still more preferable that each of $R^2$ and $R^5$ independently represents an alkoxycarbonyl group, an aryloxycarbonyl group, a carbamoyl group, a nitrile group, an imido group, or a carbamoylsulfonyl group; and it is yet more preferable that each of $R^2$ and $R^5$ independently represents an alkoxycarbonyl group, an aryloxycarbonyl group, or a carbamoyl group.

In Formula (I), it is preferable that each of $R^3$ and $R^4$ independently represents a substituted or unsubstituted alkyl group, a substituted or unsubstituted aryl group, or a substituted or unsubstituted heterocyclic group, and it is more preferable that each of $R^3$ and $R^4$ independently represents a substituted or unsubstituted alkyl group, or a substituted or unsubstituted aryl group.

The alkyl group represented by $R^3$ or $R^4$ in Formula (I) is preferably a linear, branched or cyclic, substituted or unsubstituted alkyl group having from 1 to 12 carbon atoms, such as a methyl group, an ethyl group, an n-propyl group, an isopropyl group, a cyclopropyl group, an n-butyl group, an i-butyl group, a t-butyl group, a cyclobutyl group, a cyclopentyl group, a cyclohexyl group, or a benzyl group, more preferably a branched or cyclic, substituted or unsubstituted alkyl group having from 1 to 12 carbon atoms such as an isopropyl group, a cyclopropyl group, an i-butyl group, a t-butyl group, a cyclobutyl group, a cyclopentyl group, or a cyclohexyl group, still more preferably a secondary or tertiary, substituted or unsubstituted alkyl group having from 1 to 12 carbon atoms such as an isopropyl group, a cyclopropyl group, an i-butyl group, a t-butyl group, a cyclobutyl group, or a cyclohexyl group.

The aryl group represented by $R^3$ or $R^4$ in Formula (I) is preferably a substituted or unsubstituted phenyl group, or a substituted or unsubstituted naphthyl group, and more preferably a substituted or unsubstituted phenyl group.

The heterocyclic group represented by $R^3$ or $R^4$ is preferably a substituted or unsubstituted 2-thienyl group, a substituted or unsubstituted 4-pyridyl group, a substituted or unsubstituted 3-pyridyl group, a substituted or unsubstituted 2-pyridyl group, a substituted or unsubstituted 2-furyl group, a substituted or unsubstituted 2-pyrimidinyl group, a substituted or unsubstituted 2-benzothiazolyl group, a substituted or unsubstituted 1-imidazolyl group, a substituted or unsubstituted 1-pyrazolyl group, or a substituted or unsubstituted benzotriazol-1-yl group, and more preferably a substituted or unsubstituted 2-thienyl group, a substituted or unsubstituted 4-pyridyl group, a substituted or unsubstituted 2-furyl group, a substituted or unsubstituted 2-pyrimidinyl group, or a substituted or unsubstituted 1-pyridyl group.

Hereinbelow, the metal atom or the metal compound to form the specific metal complex compound is explained.

The metal atom or the metal compound may be any metal atom or metal compound as long as it can involve the formation of a complex, and examples thereof include bivalent metal atoms, bivalent metal oxides, bivalent metal hydroxides and bivalent metal chlorides. Specific examples thereof include Zn, Mg, Si, Sn, Rh, Pt, Pd, Mo, Mn, Pb, Cu, Ni, Co, Fe, and B; metal chlorides such as $AlCl_3$, $InCl_3$, $FeCl_2$, $TiCl_2$, $SnCl_2$, $SiCl_2$, or $GeCl_2$; metal oxides such as TiO or VO; and metal hydroxides such as $Si(OH)_2$.

Among these, the Fe, Zn, Mg, Si, Pt, Pd, Mo, Mn, Cu, Ni, Co, TiO, B, and VO are preferable; Fe, Zn, Mg, Si, Pt, Pd, Cu, Ni, Co, B, and VO are more preferable; and Fe, Zn, Cu, Co, B, and VO (V=O) are still more preferable. In particular, Zn is preferable.

A preferable embodiment of the specific complex compound is described below.

Namely, it is preferable that, in Formula (I), each of $R^1$ and $R^6$ independently represents a hydrogen atom, an alkyl group, an alkenyl group, an aryl group, a heterocyclic group, a silyl group, a hydroxy group, a cyano group, an alkoxy group, an aryloxy group, a heterocyclic oxy group, an acyl group, an alkoxycarbonyl group, a carbamoyl group, an amino group, an anilino group, a heterocyclic amino group, a carbonamido group, an ureido group, an imido group, an alkoxycarbonylamino group, an aryloxycarbonylamino group, a sulfonamido group, an azo group, an alkylthio group, an arylthio group, a heterocyclic thio group, an alkylsulfonyl group, an arylsulfonyl group, or a phosphinoylamino group; each of $R^2$ and $R^5$ independently represents a hydrogen atom, a halogen atom, an alkyl group, an alkenyl group, an aryl group, a heterocyclic group, a hydroxy group, a cyano group, a nitro group, an alkoxy group, an aryloxy group, a heterocyclic oxy group, an acyl group, an alkoxycarbonyl group, an aryloxycarbonyl group, a carbamoyl group, an imido group, an alkoxycarbonylamino group, a sulfonamido group, an azo group, an alkylthio group, an arylthio group, a heterocyclic thio group, an alkylsulfonyl group, an arylsulfonyl group, or a sulfamoyl group; each of $R^3$ and $R^4$ independently represents a hydrogen atom, a halogen atom, an alkyl group, an alkenyl group, an aryl group, a heterocyclic group, a silyl group, a hydroxy group, a cyano group, an alkoxy group, an aryloxy group, a heterocyclic oxy group, an acyl group, an alkoxycarbonyl group, a carbamoyl group, an anilino group, a carbonamido group, an ureido group, an imido group, an alkoxycarbonylamino group, a sulfonamido group, an azo group, an alkylthio group, an arylthio group, a heterocyclic thio group, an alkylsulfonyl group, an arylsulfonyl group, a sulfamoyl group, or a phosphinoylamino group; $R^7$ represents a hydrogen atom, a halogen atom, an alkyl group, an aryl group, or a heterocyclic group; and the metal atom or the metal compound is Zn, Mg, Si, Pt, Pd, Mo, Mn, Cu, Ni, Co, TiO, B, or VO.

A more preferable embodiment of the specific complex compound is described below.

Namely, it is more preferable that, in Formula (M), each of $R^1$ and $R^6$ independently represents a hydrogen atom, an alkyl group, an alkenyl group, an aryl group, a heterocyclic group, a cyano group, an acyl group, an alkoxycarbonyl group, a carbamoyl group, an amino group, a heterocyclic amino group, a carbonamido group, an ureido group, an imido group, an alkoxycarbonylamino group, an aryloxycarbonylamino group, a sulfonamido group, an azo group, an alkylsulfonyl group, an arylsulfonyl group, or a phosphinoylamino group; each of $R^2$ and $R^5$ independently represents an alkyl group, an alkenyl group, an aryl group, a heterocyclic group, a cyano group, a nitro group, an acyl group, an alkoxycarbonyl group, an aryloxycarbonyl group, a carbamoyl group, an imido group, an alkylsulfonyl group, an arylsulfonyl group, or a sulfamoyl group, each of $R^3$ and $R^4$ independently represents a hydrogen atom, an alkyl group, an alkenyl group, an aryl group, a heterocyclic group, a cyano group, an acyl group, an alkoxycarbonyl group, a carbamoyl group, a carbonamido group, an ureido group, an imido group, an alkoxycarbonylamino group, a sulfonamido group, an alkylthio group, an arylthio group, a heterocyclic thio group, an alkylsulfonyl group, an arylsulfonyl group, or a sulfamoyl group; $R^7$ represents a hydrogen atom, a halogen atom, an alkyl group, an aryl group, or a heterocyclic group; and the metal atom or the metal compound is Zn, Mg, Si, Pt, Pd, Cu, Ni, Co, B, or VO.

Preferable embodiments of the specific metal complex compound include compounds represented by the following Formulae (I-1), (I-2) and (I-3).

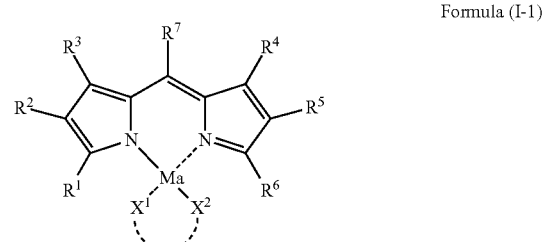

Formula (I-1)

In Formula (I-1), each of $R^1$, $R^2$, $R^3$, $R^4$, $R^5$, and $R^6$ independently represents a hydrogen atom or a monovalent substituent; $R^7$ represents a hydrogen atom, a halogen atom, an alkyl group, an aryl group, or a heterocyclic group; Ma represents a metal atom or a metal compound; $X^1$ represents a group that can be bonded to Ma; $X^2$ represents a group required for neutralization of an electric charge of Ma; and $X^1$ and $X^2$ may be linked to each other to form a 5-, 6-, or 7-membered ring together with Ma.

$R^1$ to $R^6$ in Formula (I-1) have the same definitions as $R^1$ to $R^6$ in Formula (I), respectively, and have the same preferable definitions as $R^1$ to $R^6$ in Formula (I).

Ma in Formula (I-1) represents a metal atom or a metal compound. The metal atom and the metal compound have the same definitions as the metal atom and the metal compound in the "metal complex compound in which the dipyrromethene compound represented by Formula (I) is coordinated to the metal or the metal compound" (i.e., the specific metal complex compound), respectively, and have the same preferable definitions as the metal atom and the metal compound in the specific metal complex compound.

$R^7$ in Formula (I-1) has the same definition as $R^7$ in Formula (I), and has the same preferable definition as $R^7$ in Formula (I).

$X^1$ in Formula (I-1) may be any group as long as it can be bonded to Ma.

Specific examples of a group that can be bounded to Ma include water and alcohols (e.g., methanol, ethanol, propanol), and groups derived from the compounds described in "Metal Chelates" [1] Takeichi Sakaguchi and Kyohei Ueno (1995 Nankodo), "Metal Chelates" [2] (1996), "Metal Chelates" [3] (1997) and the like. Among these, in view of manufacturability, water, carboxylic acid compounds, alcohols, amine compounds and amide compounds are preferable, and water, carboxylic acid compounds and amide compounds are more preferable.

$X^2$ in Formula (I-1) represents a group required for neutralization of the an electric charge of Ma.

Examples of the group required for neutralization of the an electric charge of Ma include a halogen atom (such as a fluorine atom, a chlorine atom, or a bromine atom), a hydroxyl group, a monovalent group derived from an aliphatic imide (such as succinimide, maleimide, glutarimide, or diacetamide, preferably succinimide or maleimide), a monovalent group derived from an aromatic imide group or a heterocyclic imide (such as phthalimide, naphthalimide, 4-bromophthalimide, 4-methylphthalimide, 4-nitrophthalimide, naphthalene carboximide, or tetrabromophthalimide, preferably phthalimide, 4-bromophthalimide, or 4-methylphthalimide), a monovalent group derived from an aromatic carboxyl acid (such as benzoic acid, 2-methoxybenzoic acid, 3-methoxybenzoic acid, 4-methoxybenzoic acid, 4-chlorobenzoic acid, 2-naphthoic acid, salicylic acid, 3,4,5-trimethoxybenzoic acid, 4-heptyloxybenzoic acid, or 4-t-butylbenzoic acid, preferably benzoic acid, 4-methoxybenzoic acid, or salicylic acid), a monovalent group derived from an aliphatic carboxylic acid (such as formic acid, acetic acid, acrylic acid, methacrylic acid, ethanoic acid, propanoic acid, lactic acid, pivalic acid, hexanoic acid, octanoic acid, 2-ethylhexanoic acid, neodecanoic acid, lauric acid, myristic acid, palmitic acid, stearic acid, oleic acid, isostearic acid, 2-hexadecyloctadecanoic acid, 2-hexyldecanoic acid, cyclopentanecarboxylic acid, cyclohexanecarboxylic acid, 5-norbornene-2-carboxylic acid, or 1-adamantane carboxylic acid, preferably acetic acid, methacrylic acid, lactic acid, pivalic acid, 2-ethylhexanoic acid, or stearyl acid), a monovalent group derived from a dithiocarbamate (such as dimethyldithiocarbamate, diethyldithiocarbamate, or dibenzyldithiocarbamate), a monovalent group derived from a sulfonamide (such as benzenesulfonamide, 4-chlorobenzenesulfonamide, 4-methoxybenzenesulfonamide, 4-methylbenzenesulfonamide, 2-methylbenzenesulfonamide, or methanesulfonamide, preferably benzenesulfonamide or methanesulfonamide), a monovalent group derived from a hydroxamic acid (such as acetohydroxamic acid, octanohydroxamic acid, or benzohydroxamic acid), and a monovalent group derived from a nitrogen-containing cyclic compound (such as hydantoin, 1-benzyl-5-ethoxyhydantoin, 1-allyl-hydantoin, 5,5-diphenylhydantoin, 5,5-dimethyl-2,4-oxazolidinedione, barbituric acid, imidazole, pyrazole, 4,5-dicyanoimidazole, 4,5-dimethylimidazole, benzimidazole, or 1H-imidazole-4,5-dicarboxylic acid diethyl, preferably 1-benzyl-5-ethoxyhydantoin, 5,5-dimethyl-2,4-oxazolidinedione, 4,5-dicyanoimidazole, or 1H-imidazole-4,5-dicarboxylic acid diethyl).

Among these, in terms of production, the group required for neutralization of an electric charge of Ma is preferably a halogen atom, an aliphatic carboxylic acid group, an aromatic carboxylic acid, an aliphatic imide group, an aromatic imide group, a sulfonic acid group, or a nitrogen-containing cyclic compound, and more preferably a hydroxyl group, an aliphatic carboxylic acid group, an aromatic imide group, or a nitrogen-containing cyclic compound.

$X^1$ and $X^2$ in Formula (I-1) may be linked to each other to form a 5-, 6-, or 7-membered ring together with Ma. The 5-, 6-, or 7-membered ring to be formed may be a saturated ring or an unsaturated ring. The 5-, 6-, or 7-membered ring may be formed from only carbon atoms and hydrogen atoms, or may be a heterocyclic ring containing at least one atom selected from the group consisting of a nitrogen atom, an oxygen atom and a sulfur atom.

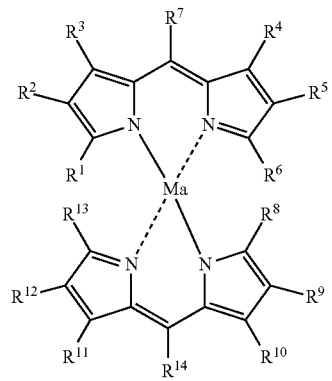

Formula (I-2)

In Formula (I-2), each of $R^1$, $R^2$, $R^3$, $R^4$, $R^5$, $R^6$, $R^8$, $R^9$, $R^{10}$, $R^{11}$, $R^{12}$, and $R^{13}$ independently represents a hydrogen atom or a monovalent substituent; each of $R^7$ and $R^{14}$ independently represents a hydrogen atom, a halogen atom, an alkyl group, an aryl group, or a heterocyclic group; and Ma represents a metal or a metal compound.

$R^1$ to $R^6$ in Formula (I-2) have the same definitions as $R^1$ to $R^6$ in Formula (I), respectively, and have the same preferable definitions as $R^1$ to $R^6$ in Formula (I).

The monovalent substituent groups represented by $R^8$ to $R^{13}$ in Formula (I-2) have the same definitions as the monovalent substituents represented by $R^1$ to $R^6$ in Formula (I), and have the same preferable definitions as the monovalent substituents represented by $R^1$ to $R^6$ in Formula (I). When the monovalent substituent represented by any of $R^8$ to $R^{13}$ in Formula (I-2) is a group that may further be substituted, the group may further be substituted by any of the above monovalent substituents. When the group has two or more substituents, these substituents may be the same as or different from one another.

$R^7$ in Formula (I-2) has the same definition as $R^7$ in Formula (I), and has the same preferable definition as $R^7$ in Formula (I).

In Formula (I-2), $R^{14}$ represents a hydrogen atom, a halogen atom, an alkyl group, an aryl group, or a heterocyclic group, and has the same preferable definition as $R^7$ in Formula (I). When $R^{14}$ represents a group that may further be substituted, the group may further be substituted by any of the above monovalent substituents. When the group has two or more substituents, these substituents may be the same as or different from one another.

Ma in Formula (I-2) represents a metal atom or a metal compound. The metal atom and the metal compound have the same definitions as the metal atom and the metal compound in the "metal complex compound in which the dipyrromethene compound represented by Formula (I) is coordinated to the metal or the metal compound" (i.e., the specific metal complex compound), respectively, and have the same preferable definitions as the metal atom and the metal compound in the specific metal complex compound.

In Formula (I-2), each of $R^8$ and $R^9$, $R^9$ and $R^{10}$, $R^{11}$ and $R^{12}$, and $R^{12}$ and $R^{13}$ may be independently linked to each other to form a 5-, 6-, or 7-membered, saturated or unsaturated ring. Each of the 5-, 6-, and 7-membered saturated and unsaturated rings has the same definition as each of the 5-, 6-, and 7-membered saturated and unsaturated rings formed by the linking of $R^1$ and $R^2$, $R^2$ and $R^3$, $R^4$ and $R^5$, or $R^5$ and $R^6$, and has the same preferable definition as each of the 5-, 6-, and 7-membered saturated and unsaturated rings formed by the linking of $R^1$ and $R^2$, $R^2$ and $R^3$, $R^4$ and $R^5$, or $R^5$ and $R^6$.

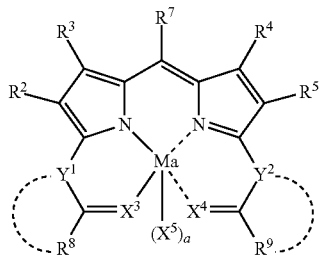

Formula (I-3)

In Formula (I-3), each of $R^2$, $R^3$, $R^4$, and $R^5$ independently represents a hydrogen atom or a monovalent substituent; $R^7$ represents a hydrogen atom, a halogen atom, an alkyl group, an aryl group, or a heterocyclic group. Each of $R^8$ and $R^9$ independently represents an alkyl group, an alkenyl group, an aryl group, a heterocyclic group, an alkoxy group, an aryloxy group, an alkylamino group, an arylamino group, or a heterocyclic amino group. Ma represents a metal atom or a metal compound. Each of $X^3$ and $X^4$ independently represents NRa (wherein Ra represents a hydrogen atom, an alkyl group, an alkenyl group, an aryl group, a heterocyclic group, an acyl group, an alkylsulfonyl group, or an arylsulfonyl group), a nitrogen atom, an oxygen atom, or a sulfur atom. Each of $Y^1$ and $Y^2$ independently represents NRb (wherein Rb represents a hydrogen atom, an alkyl group, an alkenyl group, an aryl group, a heterocyclic group, an acyl group, an alkylsulfonyl group, or an arylsulfonyl group), a nitrogen atom, an oxygen atom, a sulfur atom, or a carbon atom. $X^5$ represents a group that can be bonded to Ma; and "a" represents 1 or 2. $R^8$ and $Y^1$ may be linked to each other to form a 5-, 6-, or 7-membered ring; and $R^9$ and $Y^2$ may be linked to each other to form a 5-, 6-, or 7-membered ring.

$R^2$ to $R^5$ and $R^7$ in Formula (I-3) have the same definitions as $R^2$ to $R^5$ and $R^7$ in Formula (I), respectively, and have the same preferable definitions as $R^2$ to $R^5$ and $R^7$ in Formula (I).

Ma in Formula (I-3) represents a metal atom or a metal compound. The metal atom and the metal compound have the same definitions as the metal atom and the metal compound in the "metal complex compound in which the dipyrromethene compound represented by Formula (I) is coordinated to the metal or the metal compound" (i.e., the specific metal complex compound), respectively, and have the same preferable definitions as the metal atom and the metal compound in the specific metal complex compound.

In Formula (I-3), each of $R^8$ and $R^9$ independently represents an alkyl group (a linear, branched or cyclic alkyl group having preferably from 1 to 36, more preferably from 1 to 20, still more preferably from 1 to 12 carbon atoms, such as a methyl group, an ethyl group, a propyl group, an isopropyl group, a butyl group, an isobutyl group, a t-butyl group, a hexyl group, a 2-ethylhexyl group, a dodecyl group, a cyclopropyl group, a cyclopentyl group, a cyclohexyl group, or a 1-adamantyl group, preferably a linear or branched alkyl group having 6 to 24 carbon atoms), an alkenyl group (an alkenyl group having preferably from 2 to 24, more preferably from 2 to 12 carbon atoms, such as a vinyl group, an allyl group, or a 3-buten-1-yl group), an aryl group (an aryl group having preferably from 6 to 36, more preferably from 6 to 18 carbon atoms, such as a phenyl group or a naphthyl group), a heterocyclic group (a heterocyclic group having preferably from 1 to 24, more preferably from 1 to 12 carbon atoms, such as a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, or a benzotriazol-1-yl group), an alkoxy group (an alkoxy group having preferably from 1 to 36, more preferably from 1 to 18 carbon atoms, such as a methoxy group, an ethoxy group, a propyloxy group, a butoxy group, a hexyloxy group, a 2-ethylhexyloxy group, a dodecyloxy group, or a cyclohexyloxy group), an aryloxy group (an aryloxy group having preferably from 6 to 24, more preferably from 1 to 18 carbon atoms, such as a phenoxy group or a naphthyloxy group), an alkylamino group (an alkylamino group having preferably from 1 to 36, more preferably from 1 to 18 carbon atoms, such as a methylamino group, an ethylamino group, a propylamino group, a butylamino group, a hexylamino group, a 2-ethylhexylamino group, an isopropylamino group, a t-butylamino group, a t-octylamino group, a cyclohexylamino group, an N,N-diethylamino group, an N,N-dipropylamino group, an N,N-dibutylamino group, or an N-methyl-N-ethylamino group), an arylamino group (an aryl amino group having preferably from 6 to 36, more preferably from 6 to 18 carbon atoms, such as a phenylamino group, a naphthylamino group, an N,N-diphenylamino group, or an N-ethyl-N-phenylamino group), or a heterocyclic amino group (a heterocyclic amino group having preferably from 1 to 24, more preferably from 1 to 12 carbon atoms, such as a 2-aminopyrrole group, a 3-aminopyrazole group, a 2-aminopyridine group, or a 3-aminopyridine group).

In Formula (I-3), when the alkyl group, the alkenyl group, the aryl group, the heterocyclic group, the alkoxy group, the aryloxy group, the alkylamino group, the arylamino group, or the heterocyclic amino group represented by $R^8$ or $R^9$ is a group that may further be substituted, it may further be substituted by any of the above-mentioned monovalent substituents represented by any of $R^2$ to $R^5$. When the group has two or more substituents, these substituents may be the same as or different from one another.

In Formula (I-3), each of $X^3$ and $X^4$ independently represents NRa, a nitrogen atom, an oxygen atom, or a sulfur atom. In NRa, Ra represents a hydrogen atom, an alkyl group (a linear, branched or cyclic alkyl group having preferably from 1 to 36, more preferably from 1 to 12 carbon atoms, such as a methyl group, an ethyl group, a propyl group, an isopropyl group, a butyl group, an isobutyl group, a t-butyl group, a hexyl group, a 2-ethylhexyl group, a dodecyl group, a cyclopropyl group, a cyclopentyl group, a cyclohexyl group, or a 1-adamantyl group), an alkenyl group (an alkenyl group having preferably from 2 to 24, more preferably from 2 to 12 carbon atoms, such as a vinyl group, an allyl group or a 3-buten-1-yl group), an aryl group (an aryl group having preferably from 6 to 36, more preferably from 6 to 18 carbon atoms, such as a phenyl group or a naphthyl group), a heterocyclic group (a heterocyclic group having preferably from 1 to 24, more preferably from 1 to 12 carbon atoms, such as a 2-thienyl group, a 4-pyridyl group, a 2-furyl group, a 2-pyrimidinyl group, a 1-pyridyl group, a 2-benzothiazolyl group, a 1-imidazolyl group, a 1-pyrazolyl group, or a benzotriazol-1-yl group), an acyl group (an acyl group having preferably from 1 to 24, more preferably from 2 to 18 carbon atoms, such as an acetyl group, a pivaloyl group, a 2-ethylhexyl group, a benzoyl group, or a cyclohexanoyl group), an alkylsulfonyl group (an alkylsulfonyl group having preferably from 1 to 24, more preferably from 1 to 18 carbon atoms, such as a methylsulfonyl group, a ethylsulfonyl group, a isopropylsulfonyl group, or a cyclohexylsulfonyl group), or an arylsulfonyl group (an arylsulfonyl group having preferably from 6 to 24, more preferably from 6 to 18 carbon atoms, such as a phenylsulfonyl group or a naphthylsulfonyl group).

When Ra is a group that may further be substituted, it may further be substituted by a monovalent substituent. When Ra has two or more substituents, these substituents may be the same as or different from one another.

It is preferable that each of $X^3$ and $X^4$ independently represents an oxygen atom, or a sulfur atom, and more preferable that both $X^3$ and $X^4$ represent an oxygen atom.

In Formula (I-3), each of $Y^1$ and $Y^2$ independently represents NRb, a nitrogen atom, an oxygen atom, a sulfur atom, or a carbon atom. Rb has the same definition as Ra in $X^3$.

It is preferable that each of $Y^1$ and $Y^2$ independently represents NRb (wherein Rb represents a hydrogen atom, or an alkyl group having from 1 to 8 carbon atoms), and more preferable that both $Y^1$ and $Y^2$ represent NH.

In Formula (I-3), $R^8$ and $Y^1$ may be linked to each other so that $R^8$, $Y^1$ and the carbon atom form a 5-membered ring (e.g., cyclopentane, pyrrolidine, tetrahydrofuran, dioxolane, tetrahydrothiophene, pyrrole, furan, thiophene, indole, benzofuran or benzothiophene), a 6-membered ring (e.g., cyclohexane, piperidine, piperazine, morpholine, tetrahydropyran, dioxane, pentamethylenesulfide, dithiane, benzene, piperidine, piperazine, pyridazine, quinoline or quinazoline) or a 7-membered ring (e.g., cycloheptane or hexamethyleneimine).

In Formula (I-3), $R^9$ and $Y^2$ may be linked to each other so that $R^9$, $Y^2$ and the carbon atom form a 5-, 6-, or 7-membered ring. Examples of the 5-, 6-, or 7-membered ring formed include a ring in which one bond in the ring formed by $R^8$, $Y^1$ and the carbon atom is replaced with a double bond.

In Formula (I-3), when the 5-, 6-, or 7-membered ring formed by the linking of $R^8$ and $Y^1$, or the linking of $R^9$ and $Y^2$ is a group that may further be substituted, it may further be substituted by any of the above-mentioned monovalent substituents represented by any of $R^2$ to $R^5$. When the 5-, 6-, or 7-membered ring has two or more substituents, these substituents may be the same as or different from one another.

In Formula (I-3), $X^5$ represents a group that can be bonded to Ma. Specific examples thereof include the same groups as defined for $X^5$ in Formula (I-1).

It is preferable that $X^5$ represents a group that is bonded to Ma via an oxygen atom or a nitrogen atom, and more preferable that $X^5$ represents a group that neutralizes an electric charge of Ma, the group containing a linear or branched alkyl group having from 1 to 20 carbon atoms. In particular, $X^5$ preferably represents an alkyl ester group —OCORc (wherein Rc represents a linear or branched alkyl group having from 1 to 20 carbon atoms), such as a methyl ester, a branched pentadecyl ester, or a liner heptadecyl ester.

In Formula (I-3), "a" represents 1 or 2, and preferably represents 1.

A preferable embodiment of the compound represented by Formula (I-3) is described below.

Namely, in a preferable embodiment, $R^2$ to $R^5$, $R^7$ and Ma have the same preferable definitions as $R^2$ to $R^5$, $R^7$ and Ma of the specific metal complex compound, respectively; each of $X^3$ and $X^4$ independently represents NRa (wherein Ra represents a hydrogen atom, an alkyl group, or a heterocyclic group) or an oxygen atom; each of $Y^1$ and $Y^2$ independently represents NRb (wherein Rb represents a hydrogen atom, or an alkyl group), a nitrogen atom, or a carbon atom; $X^5$ represents a group that is bonded to Ma via an oxygen atom, or a nitrogen atom; each of $R^8$ and $R^9$ independently represents an alkyl group, an aryl group, a heterocyclic group, an alkoxy group, or an alkylamino group; and $R^8$ and $Y^1$ may be linked to each other to form a 5- or 6-membered ring; $R^9$ and $Y^2$ may be linked to each other to form a 5- or 6-membered ring; and "a" represents 1.

A more preferable embodiment of the compound represented by Formula (I-3) is described below.

Namely, in a more preferable embodiment, $R^2$ to $R^5$, $R^7$ and Ma have the same preferable definitions as $R^2$ to $R^5$, $R^7$ and Ma of the specific metal complex compound, respectively; $X^3$ and $X^4$ represent an oxygen atom; $Y^1$ represents NH; $Y^2$ represents a nitrogen atom; $X^5$ represents a group that is bonded to Ma via an oxygen atom or a nitrogen atom; each of $R^8$ and $R^9$ independently represents an alkyl group, an aryl group, a heterocyclic group, an alkoxy group, or an alkylamino group; $R^8$ and $Y^1$ may be linked to each other to form a 5- or 6-membered ring; $R^9$ and $Y^2$ may be linked to each other to form a 5- or 6-membered ring; and "a" represents 1.

Among the metal complex compounds represented by Formulae (I-1) to (I-3), which are preferable embodiments of the specific metal complex compound, the metal complex compound represented by Formula (I-3) is preferable.

Specific Examples of Dye Compound Represented by Formula (I)

Hereinbelow, specific examples of the metal complex compound in which the dipyrromethene compound represented by Formula (I) is coordinated to a metal or a metal compound used in the invention are shown, but the invention is not specifically limited to these examples.

Exemplary compounds (1) to (30) are shown below. The exemplary compounds (1) to (30) are compounds represented in the following Formula (I-4), in which $R^{101}$, $R^{102}$, $R^{103}$, $X^{101}$, and $M^1$ in Formula (I-4) represent $R^{101}$, $R^{102}$, $R^{103}$, $X^{101}$, and $M^1$ indicated in the following Tables 1 to 3, respectively.

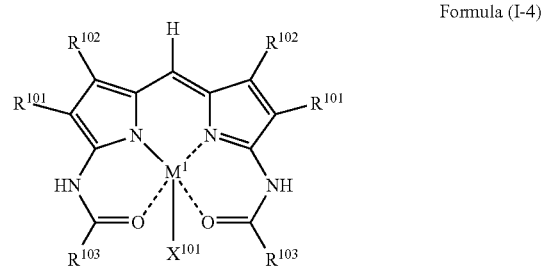

Formula (I-4)

TABLE 1
| Exemplary compound | R<sup>101</sup> | R<sup>102</sup> | R<sup>103</sup> | X<sup>101</sup> | M<sup>1</sup> |
|---|---|---|---|---|---|
| 1 | 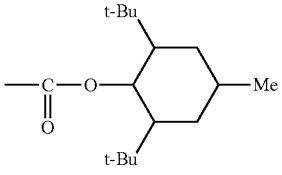 [SMILES: CC(=O)OC1C(C(C)(C)C)CC(C)CC1C(C)(C)C] | 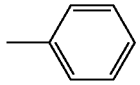 | 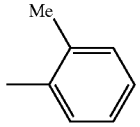 | 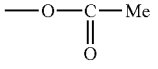 | Zn |
| 2 | 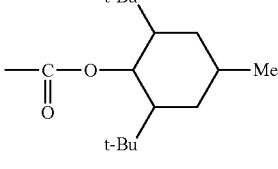 | 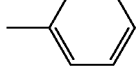 | 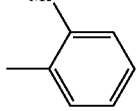 | 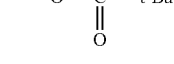 | Zn |
| 3 | 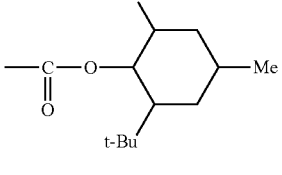 | 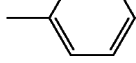 | 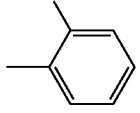 | 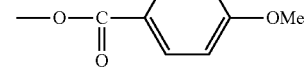 | Zn |
| 4 | 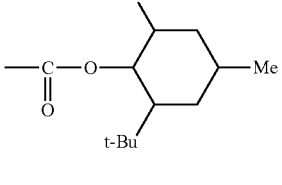 | 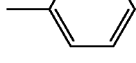 | 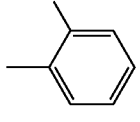 | 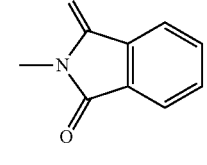 | Zn |
| 5 | 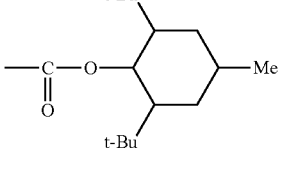 | 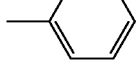 | 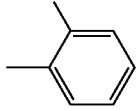 | 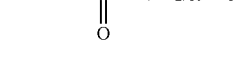 | Zn |
| 6 | 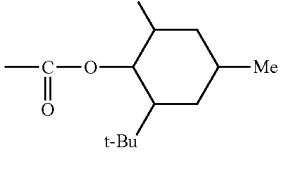 | 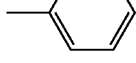 | —t-Bu | 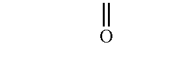 | Zn |
| 7 | 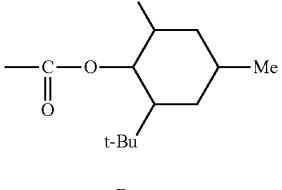 | 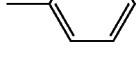 | —t-Bu | 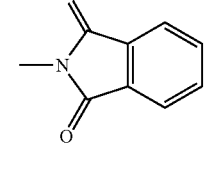 | Zn |
| 8 | 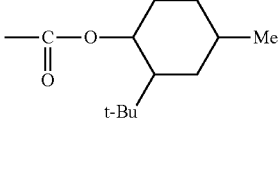 | 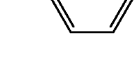 | —t-Bu | 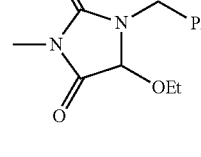 | Zn |

TABLE 1-continued
| Exemplary compound | $R^{101}$ | $R^{102}$ | $R^{103}$ | $X^{101}$ | $M^1$ |
|---|---|---|---|---|---|
| 9 | 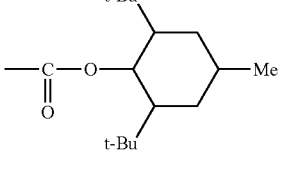 | 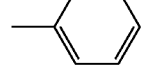 | 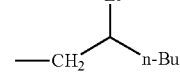 | 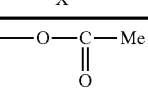 | Zn |
| 10 | 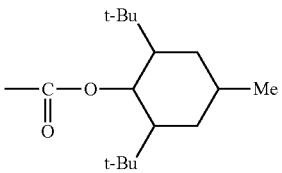 | 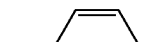 | 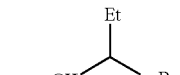 | 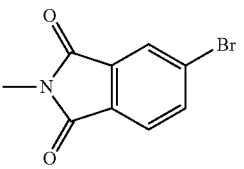 | Zn |
TABLE 2
| Exemplary compound | $R^{101}$ | $R^{102}$ | $R^{103}$ | $X^{101}$ | $M^1$ |
|---|---|---|---|---|---|
| 11 | 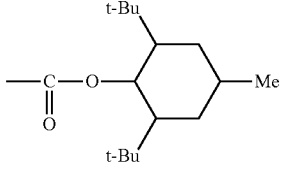 | 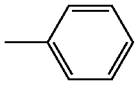 | 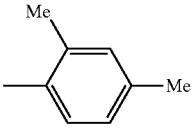 | 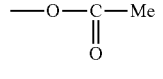 | Zn |
| 12 | 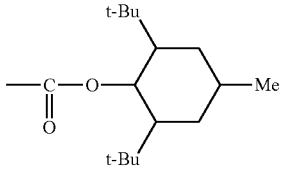 | 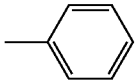 | 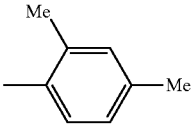 | 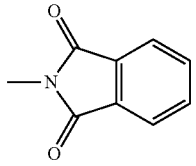 | Zn |
| 13 | 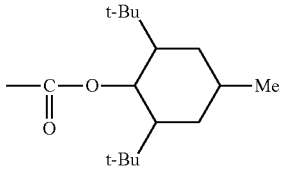 | 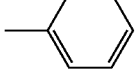 | 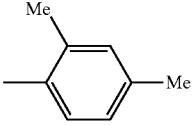 | 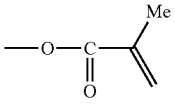 | Zn |
| 14 | 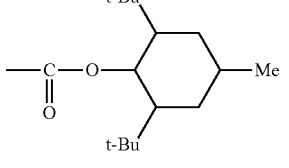 | 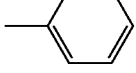 | 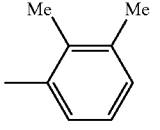 | 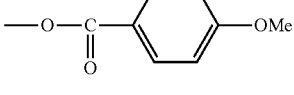 | Zn |
| 15 | 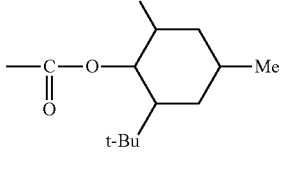 | 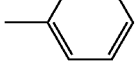 | 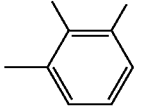 | 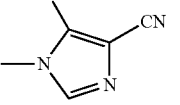 | Zn |

TABLE 2-continued
| Exemplary compound | R¹⁰¹ | R¹⁰² | R¹⁰³ | X¹⁰¹ | M¹ |
|---|---|---|---|---|---|
| 16 | 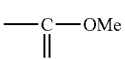 |  | 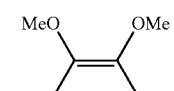 | 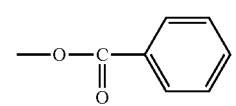 | Zn |
| 17 | 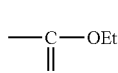 |  |  | 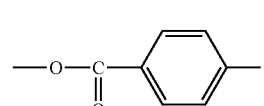 | Zn |
| 18 | 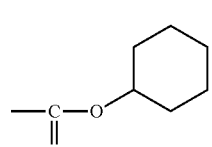 |  |  | 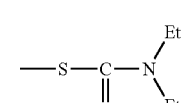 | Zn |
| 19 | (same as above, t-Bu substituted cyclohexyl ester) | Ph | 2,6-diMe-phenyl | —O—C(=O)—Me | Zn |
| 20 | (same as above, t-Bu substituted cyclohexyl ester) | Ph | 2-Br-phenyl | N-phthalimide | Zn |
TABLE 3
| Exemplary compound | R¹⁰¹ | R¹⁰² | R¹⁰³ | X¹⁰¹ | M¹ |
|---|---|---|---|---|---|
| 21 | —C(=O)—OMe | —Me | 2,3-diOMe-phenyl | —O—C(=O)—Ph | Cu |
| 22 | —C(=O)—OEt | —Et | —Me | —O—C(=O)—C₆H₄—Cl | Fe |
| 23 | cyclohexyl ester | —i-Pr | —Et | —S—C(=S)—NEt₂ | Ni |

TABLE 3-continued

| Exemplary compound | R¹⁰¹ | R¹⁰² | R¹⁰³ | X¹⁰¹ | M¹ |
|---|---|---|---|---|---|
| 24 | —C(=O)—NH₂ | cyclohexyl | —i-Pr | —O—C(=O)—C₆H₄—OH (para) | Co |
| 25 | —C(=O)—NHEt | 2,3-dimethylphenyl | 2,3,5-trimethylphenyl | —O—C(=O)—cyclohexyl | Cr |
| 26 | —C(=O)—NH—Ph | 2-thienyl | 2-methoxyphenyl (with Me) | —O—C(=O)—CH(OH)—CH₃ | Zn |
| 27 | —C(=O)—NH—C(=O)—Me | 2-pyridyl | 4-methoxyphenyl | —O—C(=O)—cyclohexyl | Zn |
| 28 | —CN | 2-naphthyl | cyclohexyl | —O—C(=O)—C₆H₄—CN (para) | Zn |
| 29 | —S(=O)₂—Me | 2,3,5-trimethylphenyl | 4-i-Pr-phenyl | N-(5-bromophthalimidyl) | Zn |
| 30 | —S(=O)₂—Ph | 2-methoxyphenyl | phenyl | N-(5-methylphthalimidyl) | Zn |

Examples of the compounds represented by Formula (I-4) further include the following exemplary compounds (31) to (45).
TABLE 4
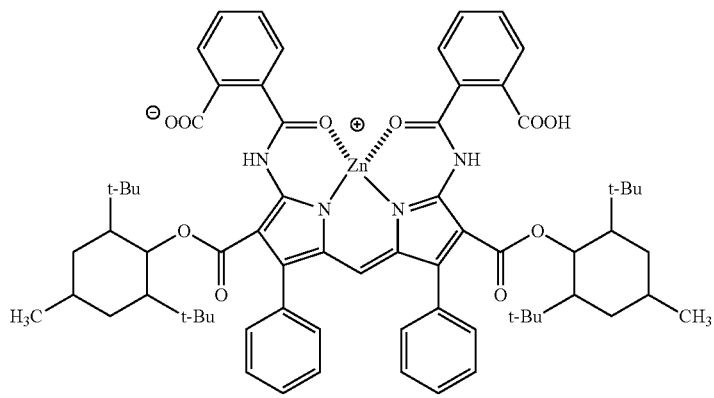
31
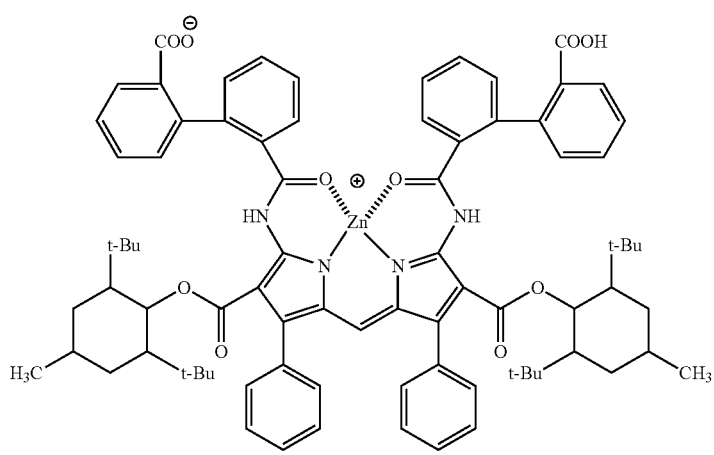
32
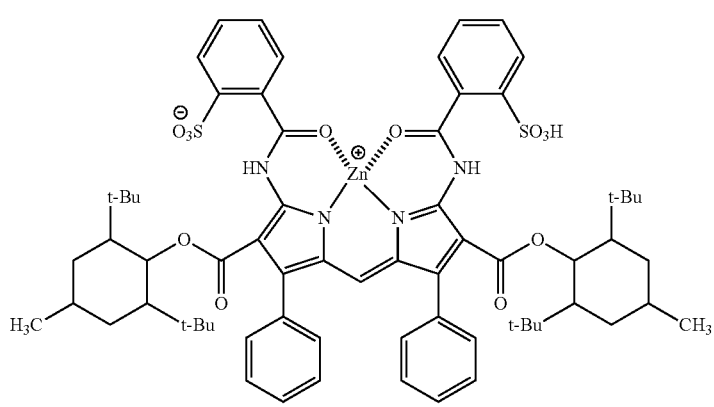
33

TABLE 4-continued
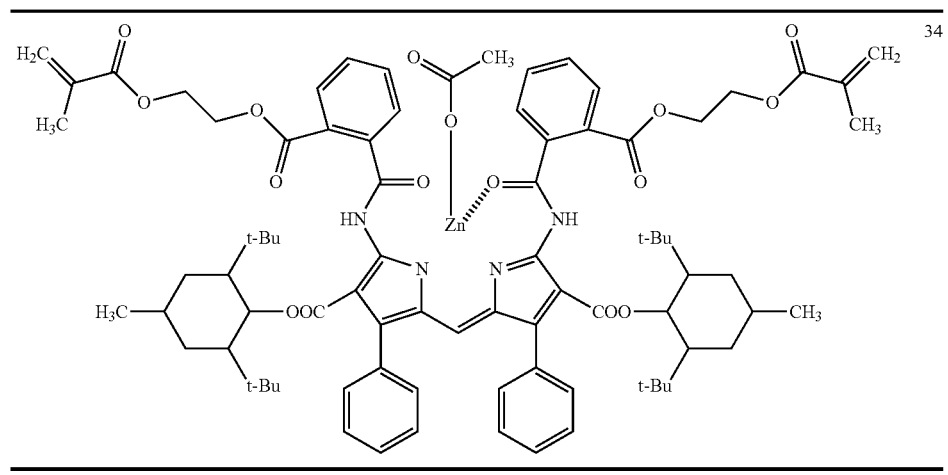
34
TABLE 5
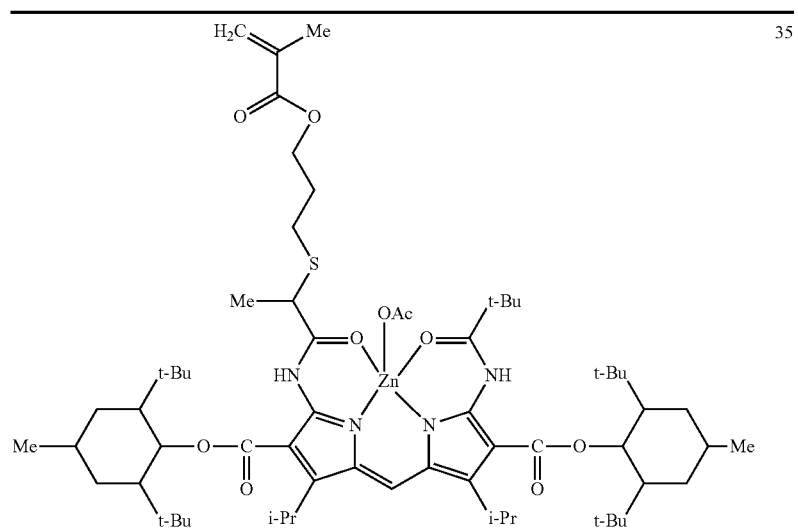
35
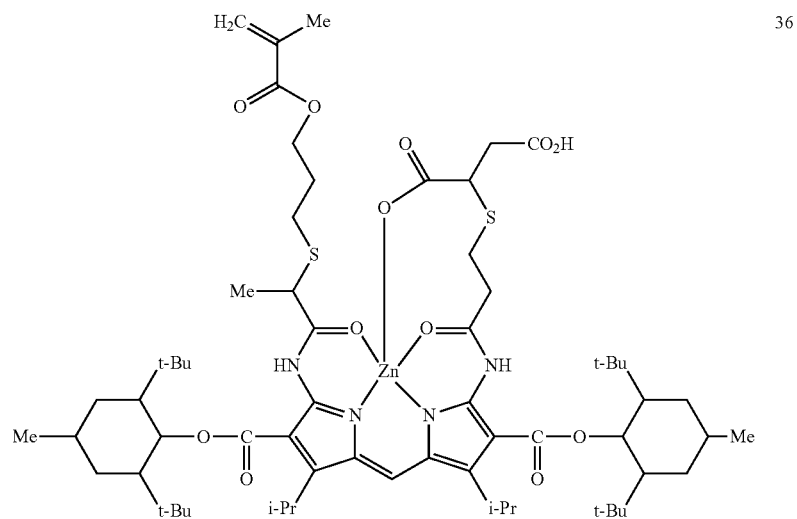
36

TABLE 5-continued
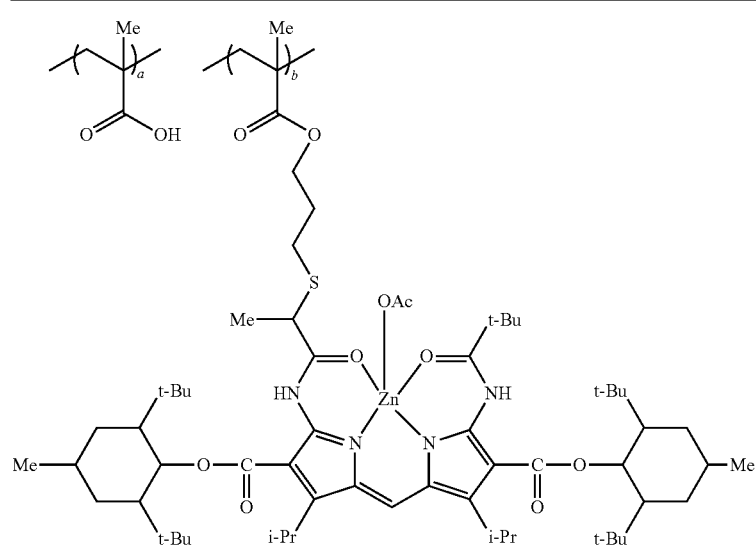
37
a/b = 30/70 (w/w)
Mw = 10,500
Mw/Mn = 1.68
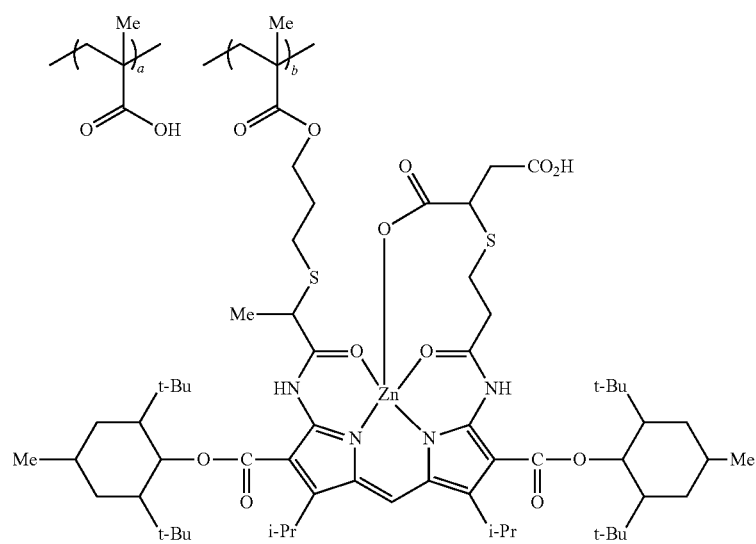
38
a/b = 15/85 (w/w)
Mw = 11,800
Mw/Mn = 1.54

TABLE 5-continued

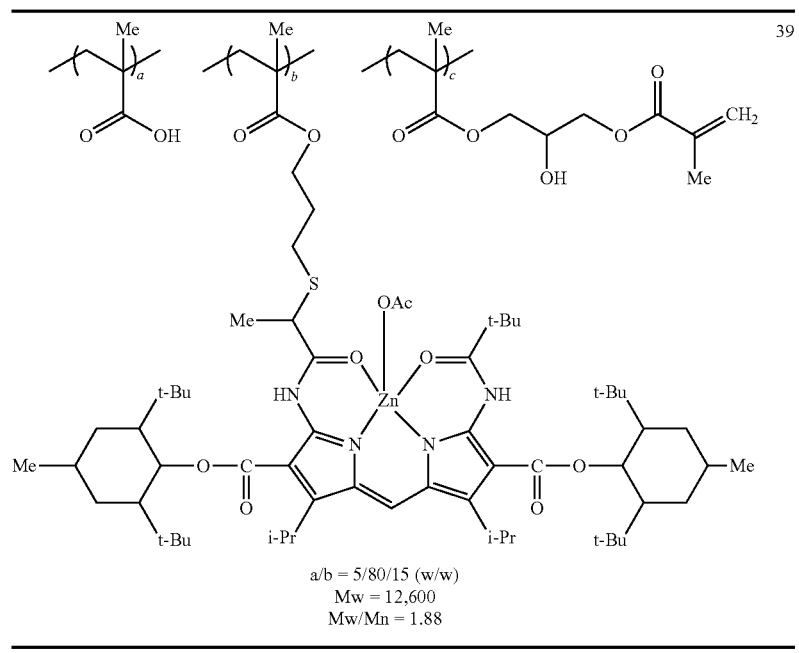

39 a/b = 5/80/15 (w/w)
Mw = 12,600
Mw/Mn = 1.88

TABLE 6

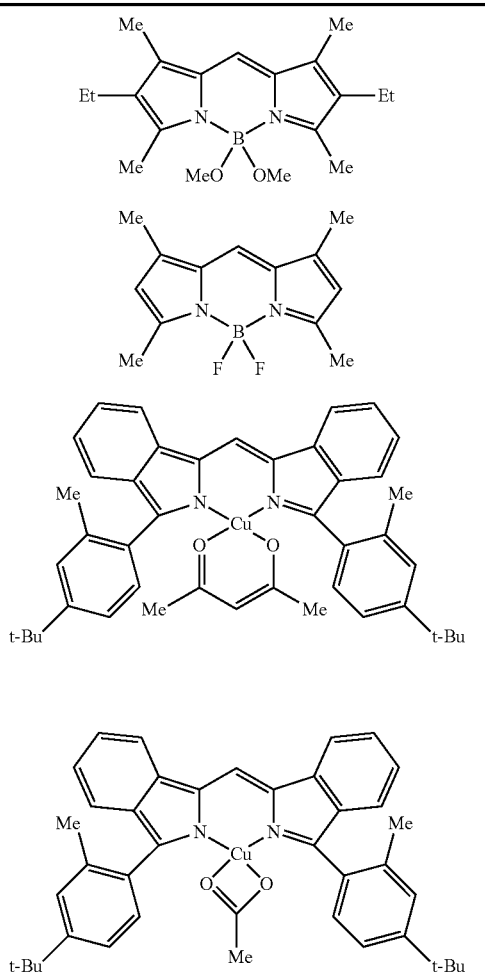

40

41

43

TABLE 6-continued

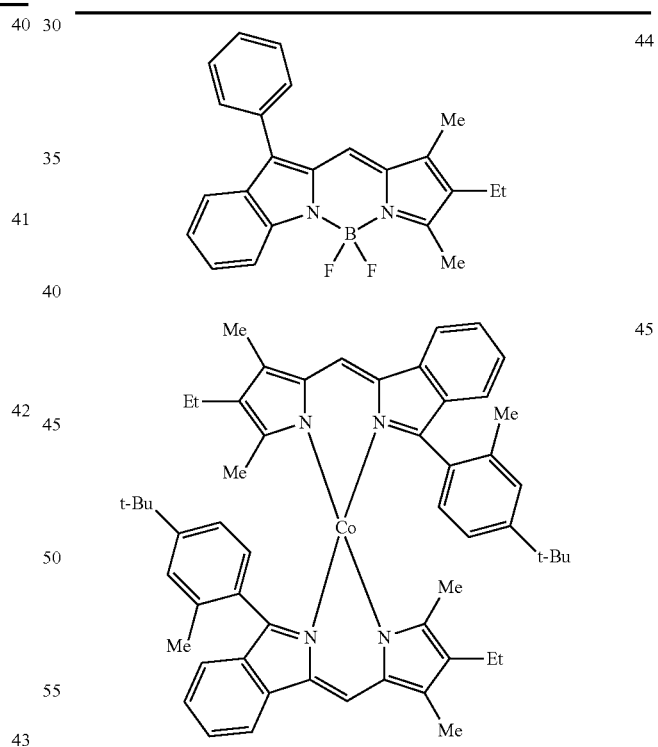

44

45

In the above exemplary compounds of the metal complex compound in which the dipyrromethene compound represented by Formula (I) is coordinated to a metal or a metal compound (the specific metal complex compound), exemplary compounds (40) to (44) are also included in exemplary compounds of the compound represented by Formula (I-1), exemplary compound (45) is also included in exemplary compounds of the compound represented by Formula (I-2), and exemplary compounds (1) to (39) are also included in exemplary compounds of the compound represented by Formula (I-3).

Preferable examples of the specific metal complex compound further include the following exemplary compounds (a-1) to (a-7).

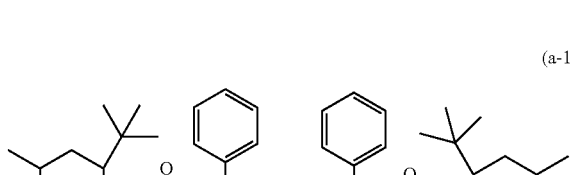
(a-1)

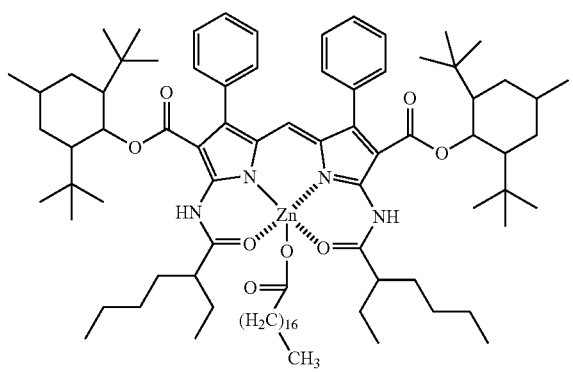
(a-2)

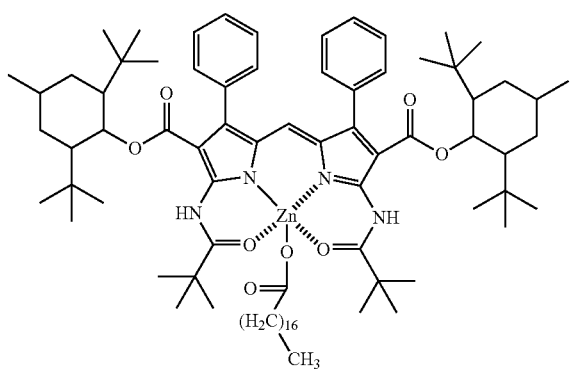
(a-3)

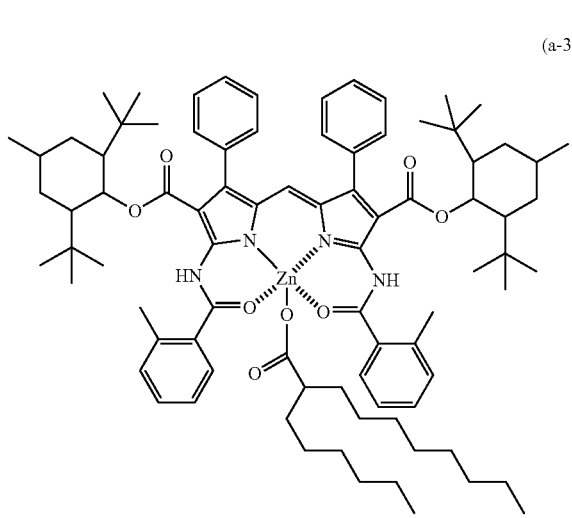

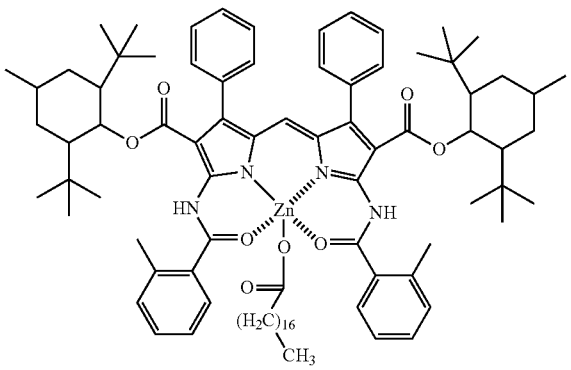
(a-4)

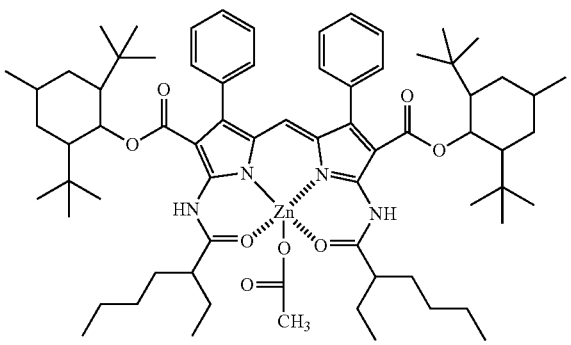
(a-5)

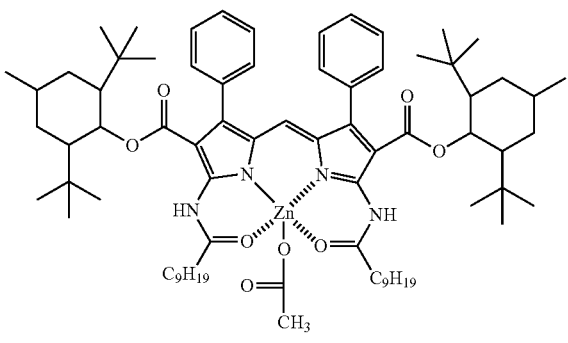
(a-6)

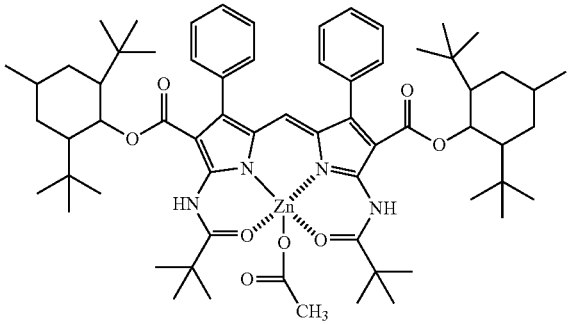
(a-7)

The dye according to the invention can be synthesized using known methods such as the method described in JP-A No. 2008-292970.

Solubility of Dipyrromethene Dye

The dipyrromethene dye according to the invention has high solubility in non-polar solvents, particularly in hydrocarbon solvents, and has a solubility in n-hexane of 1% by mass or higher at 25° C. and 0.1 MPa. Hereinafter, the solubility of a dye in n-hexane at 25° C. and 0.1 MPa is sometimes simply referred to as "solubility".

In a case in which the dipyrromethene dye according to the invention is used in an image display material for producing displays that operate on the principle of electrowetting or for producing displays that operate via electrophoresis (for example, in a display member such as an image display structure, such as (i) an optical-shutter for switching the on-off states (image displaying/non-displaying states) of pixels or (ii) a color display layer (color filter) of display devices that operate via electrophoresis), the solubility of the dye is preferably 3% by mass or higher, more preferably 5% by mass or higher. While a higher solubility is more preferable, the solubility of the dye is usually about 80% by mass or lower.

In a case in which the dipyrromethene dye according to the invention is used for electrowetting displays, it is preferable that the dipyrromethene dye is water-insoluble, from the viewpoint of the principle of the display. The "water-insoluble" refers to a property that exhibits a solubility in water under conditions of 25° C. and 1 atmospheric pressure (0.1 MPa) of 0.1% by mass or lower, and preferably 0.01% by mass or lower.

As described above, the dipyrromethene dye according to the invention may be the only dye contained in the colored composition of the invention. Alternatively, the colored composition of the invention may include a dye other than the dipyrromethene dye according to the invention, in order to obtain intended hue.

Hereinbelow, dyes other than the dipyrromethene dye according to the invention (other dyes) that are optionally contained in the colored composition of the invention are explained.

Other Dyes

The dye, other than the dipyrromethene dye according to the invention, that is optionally contained in the colored composition of the invention may be freely selected from dyes having sufficient solubility or dispersibility in solvents used, as long as the effects of the invention are not impaired.

In a case in which the colored composition of the invention is used for electrowetting displays, the other dyes may be appropriately selected from dyes that dissolve in non-polar solvents such as aliphatic hydrocarbon solvents. Specific examples thereof include Oil Blue N (alkylamine-substituted anthraquinone), Solvent Green, Sudan Red and Sudan Black.

Non-polar Solvent

The colored composition of the invention includes a non-polar solvent in addition to the dipyrromethene dye according to the invention.

Here, the non-polar solvent means a solvent having low dielectric constant (so-called apolar solvent). The non-polar solvent serves as an oil when the colored composition of the invention is used for an electrowetting display device.

The non-polar solvent contained in the colored composition of the invention is not specifically limited as long as it is a solvent that dissolves the above-described dye. Examples of the non-polar solvent include: aliphatic hydrocarbon solvents (preferably, having from 6 to 30 carbon atoms) such as n-hexane, n-decane, dodecane, tetradecane, and hexadecane; fluorine-substituted aliphatic hydrocarbon solvents (such as fluorocarbon oils); and silicone solvents (such as silicone oils). Among these, aliphatic hydrocarbon solvents are preferable.

Other Components

The colored composition of the invention may further include various additives, such as ultraviolet absorbers and antioxidants, as necessary.

The content of additives is not specifically limited. Usually, additives are used in an amount of about 20% by mass or lower with respect to the total mass of the colored composition.

An ink for a display device that operates on the principle of electrowetting can be prepared by dissolving the dipyrromethene dye according to the invention and, if necessary, other optional dyes in a non-polar solvent such as an aliphatic hydrocarbon solvent (such as those described above).

The content of the dipyrromethene dye according to the invention in the colored composition of the invention is not specifically limited. For the purpose of improving color optical density, the content of the dipyrromethene dye according to the invention is preferably from 5% by mass to 50% by mass, and more preferably from 10% by mass to 40% by mass.

The concentration (C) of the dipyrromethene dye according to the invention in the colored composition of the invention may be freely set in accordance with the purpose. In a case in which the dipyrromethene dye according to the invention is used as a violet dye for displays that operate via electrowetting, the dipyrromethene dye according to the invention may be used in a diluted state in which the dipyrromethene dye is diluted with a non-polar solvent to a concentration of usually 0.2% by mass or higher in accordance with the required $\in$C value ($\in$ indicating the absorption coefficient of the colored composition).

A molar absorption coefficient of the dipyrromethene dye according to the invention is not specifically limited, and preferably 50,000 or more, and more preferably 80,000 or more. A molar absorption coefficient of 50,000 or more is preferable since both higher display performance and improved responsiveness can be easily achieved.

The higher image color optical density (OD) value of image display devices such as an electrowetting display device according to the invention is, the higher the recognizability and the vividness of the displayed image becomes. Therefore, the OD value of the dye according to the invention per micrometer of an oil layer thickness at the maximum absorption wavelength is preferably 0.5 or more (i.e., 0.5/μm or more), more preferably 1.6/μm or more, and still more preferably 2.0/μm or more.

Image Display Structure and Display Device

The image display structure according to the invention includes a hydrophobic insulating film layer having a hydrophobic surface, an oil layer arranged so as to contact the surface of the hydrophobic insulating layer and formed using a non-conductive oil including the colored composition according to the invention for use in electrowetting displays, and a hydrophilic liquid layer arranged so as to contact the oil layer.

The image display structure according to the invention is suitable for use in display devices that operate on the principle of electrowetting or display devices that operate via electrophoresis.

The display device according to the invention is preferably a display device that operates on the principle of electrowetting.

More specifically, the display device according to the invention includes a display unit, the display unit including: a first substrate, at least part of at least one surface of the first substrate being electrically conductive; a second substrate disposed so as to face the electrically conductive surface of the first substrate; a hydrophobic insulating film disposed on at least part of a surface of the first substrate at a side at which the electrically conductive surface is disposed; a non-conductive oil disposed between the hydrophobic insulating film and the second substrate such that the non-conductive oil is movable on the hydrophobic insulating film, the non-conductive oil including a colored composition for use in electrowetting displays, and the colored composition including a non-polar solvent and a dipyrromethene dye having a solubility in n-hexane of 1% by mass or higher at 25° C. and 0.1 MPa; and an electrically conductive hydrophilic liquid disposed between the hydrophobic insulating film and the second substrate such that the hydrophilic liquid contacts the non-conductive oil, in which an image is formed by changing a shape of an interface between the non-conductive oil and the hydrophilic liquid by the application of a voltage between the hydrophilic liquid and the electrically conductive surface of the first substrate.

Since the dipyrromethene dye (metal complex dye) according to the invention has a favorable solubility in non-polar solvents, particularly in hydrocarbon solvents, the colored composition according to the invention containing the non-polar solvent and the dipyrromethene dye according to the invention has a high color optical density. Accordingly, the colored composition according to the invention is useful for display devices (e.g., displays), more specifically, display devices that operate on the principle of electrowetting or display devices that operate via electrophoresis, especially, useful as an image display materials (such as image display structures and display devices) for producing electrowetting display devices (e.g., electrowetting displays).

In a case in which the image display structure or the display device is used for electrowetting displays, a backflow phenomenon can be suppressed by using the colored composition according to the invention for constituting the image display structure or the display. Here, the backflow phenomenon refers to a phenomenon in which the area of oil, which is decreased by contraction when maintained in a voltage-applied state, increases over time.

In general, there is a tendency for the backflow phenomenon to easily occur when a large amount of dyes is dissolved in a non-polar solvent for the purpose of increasing the color optical density of an image. It is believed that a large amount of dye decreases operational sensitivity (responsiveness) of the oil at the time of the voltage application.

Although the reason is unknown, in the electrowetting display device according to the invention, the dipyrromethene dye according to the invention is easily soluble in a non-polar solvent and can achieve both increase in the color optical density of images and suppression of the backflow phenomenon. In particular, in a case in which a specific metal complex compound including a metal is used as the dipyrromethene dye according to the invention, backflow phenomenon can be further improved.

The principle of electrowetting technique is described, for example, in WO 2005-098524. This principle relates to two switchable states that depend on the wettability of a polymer solid having a hydrophobic surface with respect to a hydrophobic liquid.

The hydrophobic polymer solid preferably has white color. The hydrophobic liquid and the hydrophobic polymer solid are in the state of being surrounded by a hydrophilic liquid (e.g., water). The voltage applied between the hydrophilic liquid and the hydrophobic polymer solid generates a voltage difference, and the voltage difference causes change in surface tension of the hydrophobic liquid so as to repel the applied electric potential. This causes the hydrophobic liquid to deform to cover only a part of the bottom of the pixel (preferably, having white color) rather than the entire bottom of the pixel. The change in the surface tension between a case in which a maximum voltage is applied and a case in which a voltage is not applied can be recognized by viewers as the switching between the on- and off-states of the pixel. The pixel appears white in the on-state and colored in the off-state, thereby creating an optical image.

Electrowetting technique in the field of displays has various advantages, such as low energy consumption and rapid switching of the pixel display state (reduction of the switching time, which is essential for movie display), as compared to other display techniques. Furthermore, since the hydrophobic liquid in which the colorant is dissolved (in the present invention, the colored composition) imparts color to the pixel, the pixel in the display can be designed to exhibit various colors. The colorant should be substantially insoluble in the hydrophilic liquid. This technique realizes a transmissive display based on colors of red (R), green (G), blue (B) and black, or a reflective electrowetting display based on colors of cyan (C), magenta (M), yellow (Y) and black.

The change in surface tension of the hydrophobic liquid is proportional to the voltage applied. Therefore, various gray-scale colors can be displayed in the pixel depending on the applied voltage, whereby a high quality image can be generated in the display.

The electrowetting technique can be applied to optical filters, adaptive lenses, and lab-on-a-chip techniques, as well as displays.

The principle of the electrophoretic method utilizes a phenomenon that application of an electric field causes electrically charged particles dispersed in a solvent to migrate. The electrophoretic method has advantages in terms of low power consumption and being free from viewing angle dependence.

In a display that operates on the principle of electrophoresis, a dispersion liquid in which electrically charged particles are dispersed in a colored solution is arranged between two substrates that face each other. An image is displayed by applying a voltage of about several volts between the substrates to cause the particles to migrate in the liquid phase. For example, the display may be configured to have an image display device in which a dispersion liquid containing the colored composition according to the invention as a colored solution is microencapsulated and disposed between two substrates that face each other.

Specific embodiments of the image display structure and the display device exemplified by an embodiment of the electrowetting display device of the invention are described below by reference to the drawings.

Here, a hydrophobic insulating film layer in the image display structure of the invention serves as a hydrophobic insulating film in the electrowetting display device of the invention; an oil layer in the image display structure of the invention serves as an oil in the electrowetting display device of the invention; and a hydrophilic liquid layer in the image display structure of the invention serves as a hydrophilic liquid in the electrowetting display device of the invention.

Figure 2:
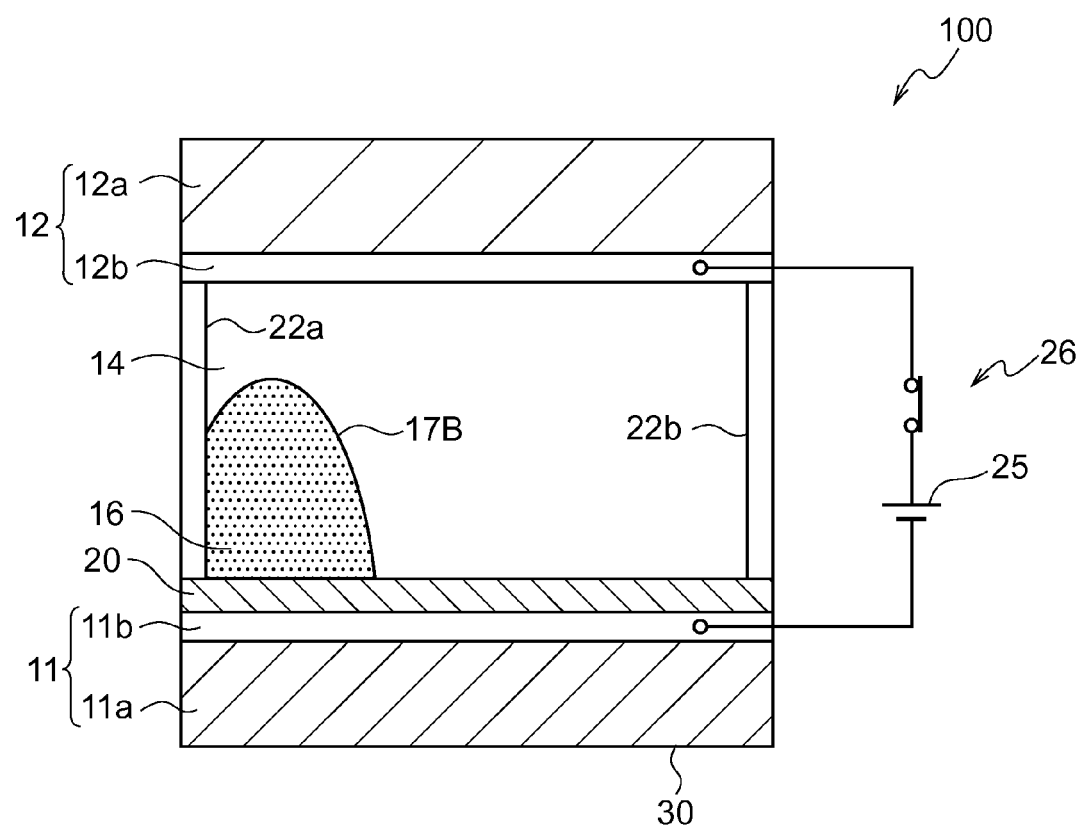
FIG. 2 is a schematic cross-sectional view showing an electrowetting display device according to an embodiment of the invention in a voltage applied state.

In FIGS. 1 and 2, an electrowetting display device according to an embodiment of the invention is illustrated. In the present embodiment, a glass substrate on which an ITO layer is provided is employed as a first substrate having electric conductivity, decane is employed as a non-polar solvent constituting the oil, and an electrolyte aqueous solution is employed as a hydrophilic liquid.

As shown in FIG. 1, an electrowetting display device 100 according to the present embodiment includes a conductive substrate (first substrate) 11, a conductive substrate 12 (second substrate) disposed to face the substrate 11, a hydrophobic insulating film 20 disposed on the substrate 11, a hydrophilic liquid 14 and an oil 16 which are filled into a space located between the hydrophobic insulating film 20 and the substrate 12 and partitioned by a silicone rubber wall 22a and a silicone rubber wall 22b. The space located between the hydrophobic insulating film 20 and the substrate 12 and partitioned by the silicone rubber wall 22a and the silicone rubber wall 22b serves as a display area (display cell) that displays an image through movement of the oil 16.

The substrate 11 includes a base material 11a and a conductive film 11b which has electric conductivity and which is disposed on the base material 11a, and the substrate 11 is configured such that the entire one face of the substrate has electric conductivity. The substrate 12 is provided at a position that faces the substrate 11. Similarly to the substrate 11, the substrate 12 includes a base material 12a and a conductive film 12b which is provided on the base material 12a and which has electric conductivity, and the substrate 12 is configured such that the entire one surface of the substrate has electric conductivity. In the present embodiment, each of the substrate 11 and the substrate 12 is constituted by a transparent glass substrate and a transparent indium tin oxide (ITO) film provided on the transparent glass substrate.

Each of the base material 11a and the base material 12a may independently be formed from a transparent material or a non-transparent material, depending on the display mode of the device. From the viewpoint of displaying an image, it is preferable that at least one selected from the group consisting of the base material 11a and the base material 12a has optical transparency. Specifically, it is preferable that at least one of the base material 11a and the base material 12a has a transmittance of 80% or higher (more preferably 90% or higher) over the entire wavelength region of from 380 nm to 770 nm.

Examples of materials for use in the base material 11a and the base material 12a include glass substrates (such as alkali-free glass substrates, soda glass substrates, PYREX (registered trademark) glass substrates, quartz glass substrates, etc.), plastic substrates (such as polyethylene naphthalate (PEN) substrates, polyethylene terephthalate (PET) substrates, polycarbonate (PC) substrates, polyimide (PI) substrates, etc.), metal substrates such as aluminum substrates and stainless-steel substrates, and semiconductor substrates such as silicon substrates. In particular, glass substrates and plastic substrates are preferable from the viewpoint of optical transmittance.

The base material may be a TFT substrate on which a thin film transistor (TFT) is provided. In this case, it is preferable that a conductive film is connected to the TFT (more specifically, the conductive film is a pixel electrode connected to the TFT). With this configuration, a voltage can be applied independently to each pixel, and active driving of the entire image display device becomes possible as in the case of known liquid crystal display devices equipped with TFTs.

The arrangement of the TFT, wires, storage capacitor, etc. on the TFT substrate may be a known arrangement, and an arrangement disclosed in JP-A No. 2009-86668 may be referenced.

Depending on the display mode of the device, each of the conductive film 11b and the conductive film 12b may independently be a transparent film or a non-transparent film. The conductive film refers to a film having electric conductivity, and, in this context, electric conductivity refers to an electric conductivity that allows application of voltage, and refers to such a property as to provide a surface resistance of 500 Ω/sq or lower (preferably 70 Ω/sq or lower, more preferably 60 Ω/sq or lower, and still more preferably 50 Ω/sq or lower).

The conductive film may be a non-transparent metal film such as a copper film, or a transparent film. From the viewpoint of displaying an image through a conductive film provided with optical transparency, the conductive film is preferably a transparent conductive film. The transparent conductive film preferably has a transparency of 80% or higher (more preferably 90% or higher) over the entire wavelength region of from 380 nm to 770 nm. An example of the transparent conductive film is a film including at least one selected from the group consisting of indium tin oxide (ITO), indium zinc oxide (IZO), tin oxide, indium oxide, zirconium oxide, zinc oxide, cadmium oxide and magnesium oxide. In particular, the transparent conductive film is preferably a film including indium tin oxide (ITO) from the viewpoint of optical transparency and electric conductivity.

The amount of tin oxide contained in the ITO-containing film is preferably in a range of from 5 to 15% by mass, and more preferably in a range of from 8 to 12% by mass, from the viewpoint of decreasing the electric resistance.

The specific resistivity of the conductive film is not specifically limited, and may be set to, for example, $1.0 \times 10^{-3}$ Ω·cm or lower.

In a preferable example of the device configuration, plural display cells that serve as display pixels are provided, and a common (same) electric potential is applied to the conductive film 12b of the substrate 12 of each display cell, but an electric potential is independently applied to the conductive film 11b of the substrate 11 display cell (display pixel) by display cell, thereby applying an independent voltage to each display cell (pixel). Configurations of known liquid crystal display devices may be referenced with respect to this exemplary configuration.

In the present embodiment, the substrate 12 also has electric conductivity, similar to the substrate 11. However, the substrate 12 may be a substrate that is not provided with a conductive film and that does not have electric conductivity, in which case, a voltage may be applied between the conductive film 11b and the hydrophilic liquid 14. In this case, the structure of the substrate 12 is not specifically limited, and examples of the material of the substrate 12 include the above-described examples of materials for use in the base material 12a.

The hydrophobic insulating film 20 is provided over the entire one surface of the conductive film 11b of the substrate 11, and contacts at least the oil 16. The hydrophobic insulating film is in a state in which the hydrophobic insulating film mainly contacts the oil when a voltage is not applied (no image display period). When a voltage is applied (image display period), the oil moves on the surface of the hydrophobic insulating film, and a region of the hydrophobic insulating film from which the oil has disappeared gets into a state of contacting with the hydrophilic liquid. In the image display structure, the hydrophobic insulating film layer corresponds to the hydrophobic insulating film 20.

The "hydrophobic" refers to a property that provides a contact angle with water of 60° or greater, and preferably refers to a property that provides a contact angle with water of 70° or greater (more preferably 80° or greater).

The contact angle can be measured using the method described in "6. static droplet method" in the "Testing method of wettability of glass substrate" defined in Japanese Industrial Standards (JIS) R3257. Specifically, the contact angle is measured using a contact angle measuring instrument (contact angle meter CA-A manufactured by Kyowa Interface Science Co., Ltd.); specifically, a water droplet having a size of 20 gradations is formed, the water droplet is discharged from the tip of the stylus and contacted with the hydrophobic insulating film whereby the water droplet is transferred onto the hydrophobic insulating film, and, after the water droplet is left to stand for 10 seconds, the morphology of the water droplet is observed through the observation hole of the contact angle meter to obtain a contact angle θ (25° C.).

The "insulating" in the context of the hydrophobic insulating film refers to a property that exhibits a specific electric resistivity of $10^7$ Ω·cm or higher, and preferably refers to a property that exhibits a specific electric resistivity of $10^8$ Ω·cm or higher (more preferably $10^9$ Ω·cm or higher).

The hydrophobic insulating film may be an insulating film that exhibits affinity for the oil 16 and that exhibits lower affinity for the hydrophilic liquid 14. However, the hydrophobic insulating film is preferably a film having a crosslinked structure derived from a polyfunctional compound, from the viewpoint of suppressing deterioration of the film due to repetitive movement of the oil caused by repetitive voltage application. In particular, the hydrophobic insulating film is preferably a film having a crosslinked structure derived from a polyfunctional compound having two or more polymerizable groups. The crosslinked structure is preferably formed by polymerizing at least one polyfunctional compound (and, if necessary, together with other monomers).

In the present embodiment, the hydrophobic insulating film is preferably formed by a copolymer obtained by copolymerizing a 5-membered cyclic perfluorodiene.

The polyfunctional compound is preferably a compound having two or more polymerizable groups in a molecule thereof. Examples of the polymerizable groups include a radical-polymerizable group, a cation-polymerizable group, and a condensation-polymerizable group. Among these, a (meth)acryloyl group, an allyl group, an alkoxysilyl group, an α-fluoroacryloyl group, an epoxy group, and a group represented by —C(O)OCH=CH$_2$ are preferable. The two or more polymerizable groups contained in the polyfunctional compound may be the same as or different from one another.

For the formation of the crosslinked structure, the polyfunctional compound may be used singly, or in combination of two or more kinds thereof.

The polyfunctional compound preferably has three or more (more preferably four or more, and still more preferably five or more) polymerizable groups in a molecule thereof. Such a structure further increases the density of the crosslinked structure in the film, and further suppresses deterioration of the hydrophobic insulating film during repetitive voltage application.

The polyfunctional compound is preferably a fluorine-containing compound, and is more preferably a polyfunctional compound having a fluorine content ratio of 35% by mass or higher (more preferably 40% by mass or higher, still more preferably 45% by mass or higher) with respect to the molecular weight of the polyfunctional compound. Inclusion of fluorine atoms in the polyfunctional compound (particularly, inclusion of fluorine atoms at a fluorine content ratio of 35% by mass or higher with respect to the molecular weight) further improves the hydrophobicity of the hydrophobic insulating film. The upper limit of the fluorine content ratio of the polyfunctional compound is not specifically limited, and the upper limit may be set to, for example, 60% by mass (preferably 55% by mass, more preferably 50% by mass) of the molecular weight.

Examples of the fluorine-containing polyfunctional compound (the polyfunctional compound) include fluorine-containing compounds disclosed in paragraphs [0007] to [0032] of JP-A No. 2006-28280.

The hydrophobic insulating film may be produced using preferably a curable composition containing the polyfunctional compound. The curable composition may include single kind of polyfunctional compound, or two or more kinds of polyfunctional compounds. The curable composition may further include a monofunctional compound. Examples of the monofunctional compound include known monofunctional monomers.

The content of the polyfunctional compound (total content in a case in which two or more polyfunctional compounds are contained; the same shall apply hereinbelow) in the curable composition is not specifically limited. From the viewpoint of curability, the content of the polyfunctional compound is preferably 30% by mass or more, more preferably 40% by mass or more, and still more preferably 50% by mass or more, with respect to the total solids content of the curable composition. The total solids content refers to all the components except for solvent.

The thickness of the hydrophobic insulating film is not specifically limited, and is preferably from 50 nm to 10 μm, and more preferably from 100 nm to 1 μm. A thickness of the hydrophobic insulating film within the above range is favorable from the viewpoint of balance between insulating properties and driving voltage.

Method for Forming Hydrophobic Insulating Film

The hydrophobic insulating film can be formed using preferably the following method. The method includes a curable layer formation process of providing a curable composition that includes a polyfunctional compound on an electrical conductive face of the substrate 11 (in the present embodiment, on a surface of the conductive film 11b of the substrate 11) so as to form a curable layer, and a curing process of curing the curable layer through polymerization of the polyfunctional compound in the curable layer formed. In this manner, the hydrophobic insulating film having a crosslinked structure can be formed.

In the case of forming the hydrophobic insulating film 20 by providing a curable layer on the substrate 11, known coating methods or transfer methods may be used for providing the curable layer on the substrate 11.

In the present embodiment, the hydrophilic liquid 14 and the oil 16 are filled into a space between the hydrophobic insulating film 20 and the substrate 12.

The hydrophilic liquid 14 and the oil 16 are liquids that do not mix with each other. As shown in FIGS. 1 and 2, the hydrophilic liquid 14 and the oil 16 are present separately, with an interface 17A or interface 17B as a boundary therebetween. In FIGS. 1 and 2, the interface 17A indicates an interface between the hydrophilic liquid 14 and the oil 16 in the power-off state, and the interface 17B indicates an interface between the hydrophilic liquid 14 and the oil 16 in the power-off state.

The oil 16, which is the above-described colored composition for electrowetting displays according to the invention, is the non-conductive liquid including at least the non-polar solvent and the dipyrromethene dye having a solubility in n-hexane of 1% by mass or more at 25° C. and 0.1 MPa. The oil preferably includes 10% by mass or more of the dipyrromethene dye according to the invention with respect to the total mass of the oil composition. The oil 16 functions as the oil layer in the image display structure.

The oil 16 is colored by the inclusion of the dipyrromethene dye according to the invention. In a case in which the oil includes 10% by mass or more (preferably, greater than 20% by mass) of the dipyrromethene dye according the invention, images having high contrast ratios, recognizability and vividness can be easily obtained. In general, there is a tendency for inclusion of a dye in a composition to constitute the oil 16 at such a density to decrease responsiveness when a voltage is applied, and deteriorate image display performance. However, in the present invention, using the colored composition for electrowetting displays according to the invention improves responsiveness of the oil 16 and suppresses a backflow phenomenon when a voltage is applied, so that an electrowetting display device having excellent image display performance can be obtained.

Here, "non-conductive" refers to a property that exhibits a specific electric resistivity of $10^6$ Ω·cm or higher (preferably $10^7$ Ω·cm or higher).

The oil 16 preferably has a small relative permittivity. The relative permittivity of the oil 16 is preferably in a range of 10.0 or lower, and more preferably in a range of from 2.0 to 10.0. A relative permittivity of the oil within the above range is preferable since a higher response speed can be achieved, and the device can be driven (operated) with a lower voltage, as compared to a case in which the relative permittivity of the oil is greater than 10.0.

The relative permittivity is a value obtained as follows. The oil 16 to be measured is filled into a glass cell having a cell gap of 10 μm and equipped with an ITO transparent electrode. The relative permittivity is obtained by measuring the electric capacity of the resultant cell at 20° C. and 40% relative humidity (RH) using a type 2353 LCR meter manufactured by NF Corporation (measurement frequency: 1 kHz).

The viscosity of the oil 16, in terms of dynamic viscosity at 20° C., is preferably 10 mPa·s or lower. The viscosity is preferably 0.01 mPa·s or higher, and more preferably from 0.01 mPa·s to 8 mPa·s. A viscosity of the oil 16 of 10 mPa·s or lower is preferable since a higher response speed can be achieved, and the device can be driven with a lower voltage, as compared to a case in which the viscosity of the oil is higher than 10 mPa·s. The dynamic viscosity is a value obtained by measurement at 20° C. using a viscometer (type 500, manufactured by Toki Sangyo Co., Ltd.).

It is preferable that the oil 16 does not substantially mix with the hydrophilic liquid described below. Specifically, the solubility (25° C.) of the oil in the hydrophilic liquid is preferably 0.1% by mass or lower, more preferably 0.01% by mass or lower, and still more preferably 0.001% by mass or lower.

Non-polar Solvent

The oil 16 includes at least one non-polar solvent. The non-polar solvent included in the oil 16 has the same definition as the non-polar solvent included in the colored composition for electrowetting displays according to the invention.

The content of a dissolved oxygen in the non-polar solvent is preferably 10 ppm or less. When the content of the dissolved oxygen is 10 ppm or less, deterioration of the oil 16 is suppressed and thus decrease in the responsiveness is suppressed. A smaller amount of the dissolved oxygen is preferable, and the amount of the dissolved oxygen is more preferably 8 ppm or less.

The content of the non-polar solvent in the oil 16 is preferably 30% by mass or higher, and more preferably 40% by mass or higher, with respect to the total amount of the oil. When the content of the non-polar solvent is 30% by mass or higher, an excellent optical-shutter property can be exhibited, and the solubility of the dye included in the oil is maintained in a more favorable manner.

The oil may include an additional solvent other than a non-polar solvent. In this case, the content of the non-polar solvent in the oil is preferably 70% by mass or higher, and more preferably 90% by mass or higher, with respect to the total content of solvents in the oil.

Dye

The oil 16 includes at least one dye as a colorant in order to display color images. A dye having solubility in non-polar solvents is suitably selected. In the present invention at least the dipyrromethene dye according to the invention is used.

The content of the dipyrromethene dye according to the invention included in the oil 16 is preferably 10% by mass or higher, with respect to the total mass of the oil 16. From the viewpoint of increasing the density and the vividness of the displayed image, the content of dipyrromethene dye in the oil 16 is preferably greater than 20% by mass, more preferably 40% by mass or higher, and still more preferably 50% by mass or higher, with respect to the total mass of the oil 16. When the amount of the dipyrromethene dye included in the oil 16 increases, the responsiveness of the oil at the time of voltage applied is reduced and the backflow phenomenon in a voltage-applied state is deteriorated, so that image display performance tends to be deteriorated. Accordingly, when the oil composition contains 10% by mass or higher (preferably greater than 20% by mass) of dipyrromethene dye, a more improved effect of the invention can be provided. From the viewpoint of increasing the response speed of the display device, the dipyrromethene dye content in the oil 16 is preferably 80% by mass or lower, more preferably 75% by mass or lower, and still more preferably 70% by mass or lower, with respect to the total mass of the oil 16.

Various Additives

As other ingredients, the oil 16 may further include various additives, such as a surfactant, an ultraviolet absorber, and an antioxidant, as necessary. In a case in which the oil 16 includes an additive, the content of additives is not specifically limited. Usually, additives are used in an amount of about 20% by mass or lower, with respect to the total mass of the oil 16.

The oil 16 may be prepared as an ink of black color or the like using single kind of ink, or as an ink of black color or the like by mixing two or more kinds of dyes.

When two or more kinds of dyes are used in combination, a mixture of a yellow dye having an absorption wavelength ranging from 400 nm to 500 nm, a magenta dye having an absorption wavelength ranging from 500 nm to 600 nm, and a cyan dye having an absorption wavelength ranging from 600 nm to 700 nm is preferably used.

Here, "black color" refers to a property that exhibits 20% or less of the difference between a maximum transmittance value and a minimum transmittance value in respective transmittances at 450 nm, 500 nm, 550 nm, and 600 nm. The difference is preferably 15% or less, and more preferably 10% or less.

The hydrophilic liquid 14 is a conductive hydrophilic liquid. The "conductive" refers to a property that exhibits a specific resistivity of $10^5$ Ω·cm or lower (preferably $10^4$ Ω·cm or lower). The hydrophilic liquid 14 constitutes the hydrophilic liquid layer in the image display structure.

The hydrophilic liquid includes, for example, an electrolyte and an aqueous medium.

Examples of the electrolyte include salts such as sodium chloride, potassium chloride, and tetrabutyl ammonium chloride. The concentration of the electrolyte in the hydrophilic liquid is preferably from 0.1 to 10 mol/L, and more preferably from 0.1 to 5 mol/L.

Preferable examples of the aqueous medium include water and alcohol. The aqueous medium may include an aqueous solvent other than water. Examples of alcohols include ethanol, ethyleneglycol, and glycerin.

The aqueous medium is preferably free of surfactant, from the viewpoint of responsiveness.

A power source 25 (voltage application means) for applying a voltage between the conductive film 11b and the conductive film 12b across the hydrophilic liquid 14, and a switch 26 for switching on/off the voltage, are electrically connected to the electrowetting display device 100.

In the present embodiment, a voltage (electric potential) can be applied across the hydrophilic liquid 14 by applying a voltage to the conductive film 12b provided on the substrate 12. As described above, the device is configured such that a surface of the substrate 12 at a side that contacts the hydrophilic liquid 14 has electric conductivity (a configuration in which an ITO film as a conductive film is present at a side of the base material 12a that contacts the hydrophilic liquid 14) in the present embodiment. However, the configuration is not limited thereto. For example, a configuration in which a voltage (electric potential) is applied from an electrode inserted into the hydrophilic liquid 14 without provision of the conductive film 12b on the substrate 12, may be adopted.

Hereinbelow, the operation of the electrowetting display device 100 (the power-off state and the power-on state) is described.

As shown in FIG. 1, in the power-off state, the oil 16 contacts the entire surface of the hydrophobic insulating film 20 due to high affinity between the hydrophobic insulating film 20 and the oil 16. When a voltage is applied by switching on the switch 26 of the electrowetting display device 100, the interface between the hydrophilic liquid 14 and the oil 16 deforms from the interface 17A shown in FIG. 1 to the interface 17B shown in FIG. 2. Due to the deformation, the area of contact between the hydrophobic insulating film 20 and the oil 16 decreases, and the oil 16 moves to a side of the cell as shown in FIG. 2. This phenomenon occurs because a charge is generated on the surface of the hydrophobic insulating film 20 due to the voltage application, and the charge causes the hydrophilic liquid 14 to come to contact the hydrophobic insulating film 20 by displacing the oil 16 that contacted the hydrophobic insulating film 20.

When the switch 26 of the electrowetting display device 100 is turned off to cease the application of the voltage, the device returns to the state shown in FIG. 1.

The operations shown in FIGS. 1 and 2 are repeated in the electrowetting display device 100.

In the above description, an embodiment of the electrowetting display device is described with reference to FIGS. 1 and 2. However, embodiments of the electrowetting display device are not limited to the embodiment described above.

For example, although the conductive film 11b is provided on the entire surface of the base material 11a in the substrate 11 shown in FIGS. 1 and 2, the conductive film 11b may alternatively be provided only on a part of the surface of the base material 11a. Further, although the conductive film 12b is provided on the entire surface of the base material 12a in the substrate 12 shown in FIGS. 1 and 2, the conductive film 12b may alternatively be provided only on a part of the surface of the base material 12a.

In an embodiment, a colorant may be incorporated into the oil 16 so as to color the oil 16 in a desired color (e.g., black, red, green, blue, cyan, magenta, yellow, etc.), whereby the oil 16 can function as a pixel that contributes to image display by the electrowetting display device. In this case, the oil 16 functions, for example, as an optical shutter that switches between the on-state and the off-state of the pixel. Further, in this case, the electrowetting display device may be configured to be any of transmission-type, reflection-type or semi-transmission-type.

The electrowetting display device in the present embodiment may have a UV shielding layer at an outer side (a side opposite to a side that faces the oil) of at least one selected from the group consisting of the first substrate and the second substrate. Provision of the UV shielding layer further improves the light fastness of the display device.

The UV shielding layer may be a known UV shielding layer. For example, a UV shielding layer containing a UV absorber (for example, a UV cut film) may be used. The UV shielding layer preferably absorbs 90% or more of light having a wavelength of 380 nm.

The UV shielding layer may be provided using known methods, such as a method of adhering the UV shielding layer onto an outer side of at least one selected from the group consisting of the first substrate and the second substrate by using an adhesive agent.

In the electrowetting display device, the structure shown in FIG. 1 (a space (display cell) located between the hydrophobic insulating film 20 and the substrate 12 and partitioned, for example, in a grid pattern by the silicone rubber wall 22a and the silicone rubber wall 22b) as a pixel serves as a display area, and such display cells are two-dimensionally arranged, whereby image display can be realized. Here, the conductive film 11b may be a film that is patterned independently for each pixel (each display cell), in the case of, for example, an active matrix type image display device. Alternatively, the conductive film 11b may be a film that is patterned in a stripe shape extending over plural pixels (plural display cells), as in the case of, for example, a passive matrix type image display device.

The electrowetting display device 100 can be configured as a transmission-type display device by using substrates having optical transparency such as glass or plastic (e.g., polyethylene terephthalate, polyethylene naphthalate) as the substrate 11a and the substrate 12a, and using films having optical transparency as the conductive film 11b, the conductive film 12b and the hydrophobic insulating film 20. A reflection-type display device can be obtained by providing a reflective plate at the outside of the display cell in the pixel of the transmission-type display device.

Alternatively, a pixel of a reflection-type image display device can be formed by using a film having a function as a reflective plate (e.g., a metal film such as an aluminum film or an aluminum alloy film) as the conductive film 11b, or by using a substrate having a function as a reflective plate (e.g., a metal substrate such as an aluminum substrate or an aluminum alloy substrate) as the base material 11a.

In the present embodiment, other configurations of the display cells constituting the electrowetting display device 100 and the image display devices may be selected from known configurations disclosed in, for example, JP-A Nos.

2009-86668, H10-39800, 2005-517993, 2004-252444, 2004-287008, 2005-506778, 2007-531917 and 2009-86668. The configurations of known active-matrix or passive-matrix liquid crystal display devices can also be referenced.

The electrowetting display device may be configured to include, in addition to the display cells (display pixels), members employed in known liquid crystal devices, such as a back light, a spacer for adjusting the cell gap and a sealing material for sealing, in accordance with the necessity. In this case, the oil and the hydrophilic liquid may be provided by, for example, being applied by an inkjet method to the space partitioned by the silicone rubber walls on the substrate 11.

The electrowetting display device 100 of the present embodiment may be produced by, for example, a method including:

a substrate preparation process of preparing the substrate 11;

a process of forming the hydrophobic insulating film 20 on the conductive surface side of the substrate 11;

a partition forming process of forming partitions that partition a face of the first substrate on which the hydrophobic insulating film has been formed;

an application process of applying the oil 16 and the hydrophilic liquid 14 to a region partitioned by the partition (for example, by an inkjet method); and a cell forming process of forming a cell (display area) by superposing the second substrate 12 on a side of the substrate 11 to which the oil 16 and the hydrophilic liquid 14 has been applied;

and optionally further including, if necessary:

a sealing process of sealing the cell by adhering the substrate 11 and the substrate 12 at an area around the cell. The adhesion between the substrate 11 and the substrate 12 may be carried out using a sealing member usually employed in production of liquid crystal display devices.

The method may further include, after the partition forming process but before the cell forming process, a spacer forming process of forming a spacer for adjusting a cell gap.

EXAMPLES

The invention is described more specifically below by reference to examples. However, the invention is not limited to the examples, as long as the gist of the invention is retained.

Preparation of Dye Solution (Colored Composition for Electrowetting Displays)

Examples 1 to 7

Each of the dyes shown above as Exemplary Compounds a-1 to a-7 was dissolved in a solvent (n-hexane) to make a 0.001% by mass solution, so that a dye solution (ink) was prepared. Each of the dye solutions (inks) obtained was evaluated with respect to its color, absorption maximum wavelength (λ max), absorbance (abs) and absorption coefficient (∈), and solubility (% by mass) of each of the dyes in a solvent. The evaluation results are shown in Table 7.

Evaluation Method for Each Property

1. Color of Solution

The color of the dye solution was visually evaluated.

2. Absorption Maximum Wavelength, Absorbance and Absorption Coefficient of Solution The absorption maximum wavelength (λmax) and the absorbance (abs) of the dye solution were measured using a visible-light spectrophotometer (trade name: UV-1800PC, manufactured by Shimadzu Corporation). The absorption coefficient (∈) was calculated based on the Lambert-Beer law.

3. Solubility in Non-polar Solvent

The solubility of each of the dyes in n-hexane (non-polar solvent), was determined as follows.

Each of the dyes to be measured was dissolved in n-hexane heated at 50° C., to prepare a saturated solution. The saturated solution obtained was then left in an environment of 25° C. and 0.1 MPa for 1 hour. The precipitated dye was filtered, and the precipitation amount was measured, from which the solubility (% by mass) of the dye in n-hexane at 25° C. and 0.1 MPa was calculated.

Comparative Example 1

The dye solution of Comparative Example 1 was prepared in the same manner as in the preparation of the dye solution in Example 1, except that Exemplary Compound a-1 as a dye was replaced by the following compound C-101 (Exemplary Compound I-22 described in JP-A 2008-292970). The dye solution obtained was evaluated, in the same manner as Example 1, with respect to its color, absorption maximum wavelength and absorption coefficient, and the solubility of the dye. The evaluation results are shown in Table 7.

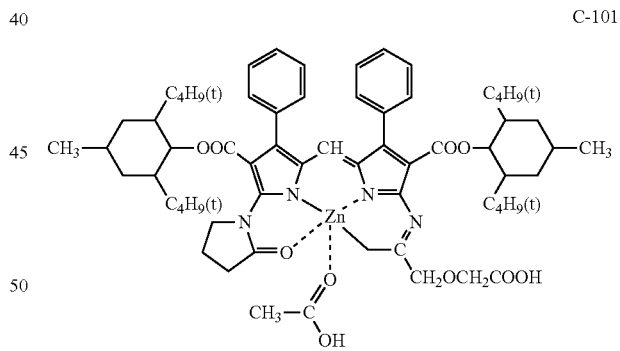

C-101

TABLE 7

|  | Dye | Solvent | Color of Solution | Absorbance (abs) | Absorption coefficient (∈) | Absorption maximum wavelength (λmax) | Solubility in n-hexane (% by mass) |
| --- | --- | --- | --- | --- | --- | --- | --- |
| Ex. 1 | a-1 | hexane | purple | 0.609 | 4.27E+04 | 550.5 | 10.5 |
| Ex. 2 | a-2 | hexane | purple | 0.593 | 9.84E+04 | 550.0 | 5.0 |
| Ex. 3 | a-3 | hexane | purple | 0.874 | 7.54E+04 | 546.0 | 5.0 |
| Ex. 4 | a-4 | hexane | purple | 0.836 | 1.18E+05 | 560.0 | 5.3 |
| Ex. 5 | a-5 | hexane | purple | 0.975 | 1.15E+05 | 550.5 | 8.0 |
| Ex. 6 | a-6 | hexane | purple | 0.911 | 1.10E+05 | 549.5 | 6.1 |
| Ex. 7 | a-7 | hexane | purple | 0.897 | 1.01E+05 | 549.5 | 1.2 |

TABLE 7-continued

| | Dye | Solvent | Color of Solution | Absorbance (abs) | Absorption coefficient ($\epsilon$) | Absorption maximum wavelength ($\lambda$max) | Solubility in n-hexane (% by mass) |
|---|---|---|---|---|---|---|---|
| Comp. Ex. 1 | C-101 | hexane | hardly colored | 0.833 | 8.24E+04 | 549.5 | 0.012 |

* Ex.: Example; Comp. Ex.: Comparative Example

Table 7 indicates that exemplary compounds a-1 to a-7 have higher solubility in hydrocarbon solvents than comparative example compound C-101.

Therefore, it is understood that exemplary compounds a-1 to a-7 are suitable for producing color filers for displays operate on the principle of electrowetting or displays operate via electrophoresis.

Production of Test Cell

Example 8 and Example 9

Preparation of Dye Solution (Colored Composition for Electrowetting Displays)

Argon gas was bubbled in n-decane, thereby obtaining an n-decane solution containing 10 ppm or less of dissolved oxygen. Dyes indicated in Table 8 below were added to the obtained n-decane solution at a concentration of 10% by mass. In this manner, dye solutions in Examples 8 and 9 were prepared.

Preparation of Test Cell

A glass substrate (10 mm×10 mm) on which an indium tin oxide (ITO) film having a thickness of 100 nm was formed as a transparent electrode was prepared. On the surface of the ITO film, a fluoropolymer (trade name: CYTOP manufactured by Asahi Glass Co., Ltd., model CTL-809M) was coated in a thickness of 600 nm, thereby forming a fluoropolymer layer as a hydrophobic insulating film. Subsequently, a picture frame-shaped silicone rubber wall left after cutting out a 8 mm×8 mm×50 μm-sized piece from the central portion of a 1 cm×1 cm-sized silicone rubber (a sealing material having a thickness of 50 μm; SILIUS (tradename) manufactured by Fuso Rubber Co., Ltd.) was placed on the fluoropolymer layer, thereby forming a display area.

The n-decane solution (dye solution) prepared above was injected, in a thickness of 4 μm, into the space enclosed by the silicone rubber wall. Onto the injected dye solution, ethyleneglycol was further injected in a thickness of 46 μm. Another sheet of the glass plate equipped with the ITO film was further placed thereon such that the ITO film thereof faced the dye solution and the aqueous solution of the electrolyte, and the glass plate was fixed. In this way, an electrowetting test cell having a structure illustrated in FIG. 1 was prepared.

Evaluation

A DC voltage of 100V was applied between the ITO films (transparent electrodes) of the two ITO-equipped glass substrates using a signal generator, such that a minus voltage was applied to the ITO electrode on a side on which the fluoropolymer layer (hydrophobic insulating film) was formed. In this state, the display cell (display cell 30 shown in FIG. 2) was observed, and it was confirmed that the dye ink (dye solution) moved on the surface of the fluoropolymer layer in one direction, and that the area of the region on the fluoropolymer layer that was covered by the dye ink decreased.

The responsiveness of the dye solution, and the extent of backflow phenomenon when the voltage-applied state was maintained were evaluated.

The decrease of the area due to the voltage application was evaluated based on the area contraction ratio (%) calculated according to the following Equation (1). The extent of backflow phenomenon was evaluated based on the backflow ratio (%) calculated according to the following Equation (2).

(a) Response time [msec]=the time elapsed from the initiation of the voltage application until the colored composition reaches the most contracted state (b) Area contraction ratio (%)=(the area of the colored composition in the most contracted state)/(the area of the colored composition before the voltage application)×100  (Equation (1))

(c) Backflow ratio (%)=(the area of the colored composition when the voltage-applied state has been maintained for 5 seconds)/(the area of the colored composition in the most contracted state)×100  (Equation (2))

In regard to the OD value (color optical density of images), each dye was measured and evaluated with respect to OD value at its maximum absorption wavelength, using a spectral radiometer SR-3 manufactured by Topcon Technohouse Corporation. The OD value is shown as a value per micrometer of the oil layer thickness.

TABLE 8

| | | Responsiveness | | | | |
|---|---|---|---|---|---|---|
| | Dye | Area Contraction Ratio (%) | Response Time | Backflow Ratio (%) | OD Value | Remarks |
| Example 8 | a-1 | 30 | less than 200 msec | 110 | 1.6 | Present Invention |
| Example 9 | a-5 | 26 | less than 200 msec | 105 | 2 | Present Invention |

Dye concentration: 10% by mass
* An area contraction ratio of 100% indicates a non-contracted state.

As shown in Table 8, the electrowetting display device employing the colored composition according to the invention as the dye solution has excellent responsiveness, and exhibits the suppressed backflow phenomenon at the time of image display (in a voltage-applied state).

All publications, patent applications, and technical standards mentioned in this specification are herein incorporated by reference to the same extent as if each individual publication, patent application, or technical standard was specifically and individually indicated to be incorporated by reference.

What is claimed is:

1. A colored composition for use in electrowetting displays, the colored composition comprising:

a dipyrromethene dye having a solubility in n-hexane of 1% by mass or higher at 25° C. and 0.1 MPa, the dipyrromethene dye being a compound represented by the following Formula (I-3):

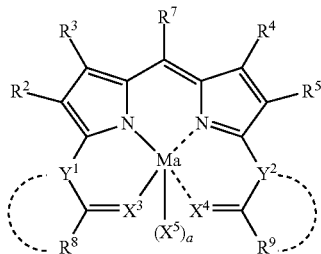

Formula (I-3)

wherein, in Formula (I-3), each of $R^2$, $R^3$, $R^4$, and $R^5$ independently represents a hydrogen atom or a monovalent substituent; $R^7$ represents a hydrogen atom, a halogen atom, an alkyl group, an aryl group, or a heterocyclic group; each of $R^8$ and $R^9$ independently represents an alkyl group, an alkenyl group, an aryl group, a heterocyclic group, an alkoxy group, an aryloxy group, an alkylamino group, an arylamino group, or a heterocyclic amino group; Ma represents a metal atom or a metal compound; each of $X^3$ and $X^4$ independently represents NRa (wherein Ra represents a hydrogen atom, an alkyl group, an alkenyl group, an aryl group, a heterocyclic group, an acyl group, an alkylsulfonyl group, or an arylsulfonyl group), a nitrogen atom, an oxygen atom, or a sulfur atom; each of $Y^1$ and $Y^2$ independently represents NRb (wherein Rb represents a hydrogen atom, an alkyl group, an alkenyl group, an aryl group, a heterocyclic group, an acyl group, an alkylsulfonyl group, or an arylsulfonyl group), a nitrogen atom, an oxygen atom, a sulfur atom, or a carbon atom; $X^5$ represents a group that can be bonded to Ma; "a" represents 1 or 2; $R^8$ and $Y^1$ may be linked to each other to form a 5-, 6-, or 7-membered ring; and $R^9$ and $Y^2$ may be linked to each other to form a 5-, 6-, or 7-membered ring; and a non-polar solvent.

2. The colored composition according to claim 1, wherein at least one selected from the group consisting of $R^2$, $R^3$, $R^4$, $R^5$, $R^8$ and $R^9$ in Formula (I-3) represents a linear or branched alkyl group having from 1 to 20 carbon atoms.

3. The colored composition according to claim 1, wherein $X^5$ in Formula (I-3) represents a group that neutralizes an electric charge of Ma, the group containing a linear or branched alkyl group having from 1 to 20 carbon atoms.

4. The colored composition according to claim 1, wherein $X^5$ in Formula (I-3) represents a linear or branched alkyl ester group having from 1 to 20 carbon atoms.

5. An image display structure comprising:

a hydrophobic insulating film layer having a hydrophobic surface;

an oil layer arranged so as to contact the hydrophobic surface and formed using a non-conductive oil comprising the colored composition according to claim 1; and a hydrophilic liquid layer arranged so as to contact the oil layer.

6. An electrowetting display device comprising a display unit, the display unit comprising:

a first substrate, at least part of a surface of the first substrate being electrically conductive;

a second substrate disposed so as to face the electrically conductive surface of the first substrate;

a hydrophobic insulating film disposed on at least part of a surface of the first substrate at a side at which the electrically conductive surface is disposed;

a non-conductive oil disposed between the hydrophobic insulating film and the second substrate such that the non-conductive oil is movable on the hydrophobic insulating film, the non-conductive oil comprising a colored composition for use in electrowetting displays, and the colored composition comprising a non-polar solvent and a dipyrromethene dye having a solubility in n-hexane of 1% by mass or higher at 25° C. and 0.1 MPa; and an electrically conductive hydrophilic liquid disposed between the hydrophobic insulating film and the second substrate such that the hydrophilic liquid contacts the non-conductive oil, wherein an image is formed by changing a shape of an interface between the non-conductive oil and the hydrophilic liquid by the application of a voltage between the hydrophilic liquid and the electrically conductive surface of the first substrate, and wherein the dipyrromethene dye is a compound represented by the following Formula (I-3):

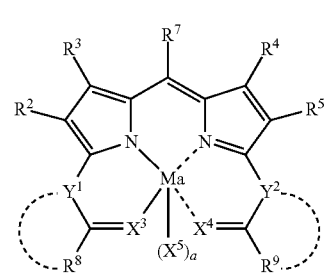

Formula (I-3)

wherein, in Formula (I-3), each of $R^2$, $R^3$, $R^4$, and $R^5$ independently represents a hydrogen atom or a monovalent substituent; $R^7$ represents a hydrogen atom, a halogen atom, an alkyl group, an aryl group, or a heterocyclic group; each of $R^8$ and $R^9$ independently represents an alkyl group, an alkenyl group, an aryl group, a heterocyclic group, an alkoxy group, an aryloxy group, an alkylamino group, an arylamino group, or a heterocyclic amino group; Ma represents a metal atom or a metal compound; each of $X^3$ and $X^4$ independently represents NRa (wherein Ra represents a hydrogen atom, an alkyl group, an alkenyl group, an aryl group, a heterocyclic group, an acyl group, an alkylsulfonyl group, or an arylsulfonyl group), a nitrogen atom, an oxygen atom, or a sulfur atom; each of $Y^1$ and $Y^2$ independently represents NRb (wherein Rb represents a hydrogen atom, an alkyl group, an alkenyl group, an aryl group, a heterocyclic group, an acyl group, an alkylsulfonyl group, or an arylsulfonyl group), a nitrogen atom, an oxygen atom, a sulfur atom, or a carbon atom; $X^5$ represents a group that can be bonded to Ma; "a" represents 1 or 2; $R^8$ and $Y^1$ may be linked to each other to form a 5-, 6-, or 7-membered ring; and R⁹ and Y² may be linked to each other to form a 5-, 6-, or 7-membered ring.

7. The electrowetting display device according to claim 6, wherein at least one selected from the group consisting of $R^2$, $R^3$, $R^4$, $R^5$, $R^8$, and $R^9$ in Formula (I-3) represents a linear or branched alkyl group having from 1 to 20 carbon atoms.

8. The electrowetting display device according to claim 6, wherein $X^5$ in Formula (I-3) represents a group that neutralizes an electric charge of Ma, the group containing a linear or branched alkyl group having from 1 to 20 carbon atoms.

9. The electrowetting display device according to claim 6, wherein $X^5$ in Formula (I-3) represents a linear or branched alkyl ester group having from 1 to 20 carbon atoms.

10. A colored composition for use in electrowetting displays, the colored composition comprising:
a dipyrromethene dye having a solubility in n-hexane of 1% by mass or higher at 25° C. and 0.1 MPa, the dipyrromethene dye being at least one compound selected from the group consisting of the following (a-1) to (a-7):

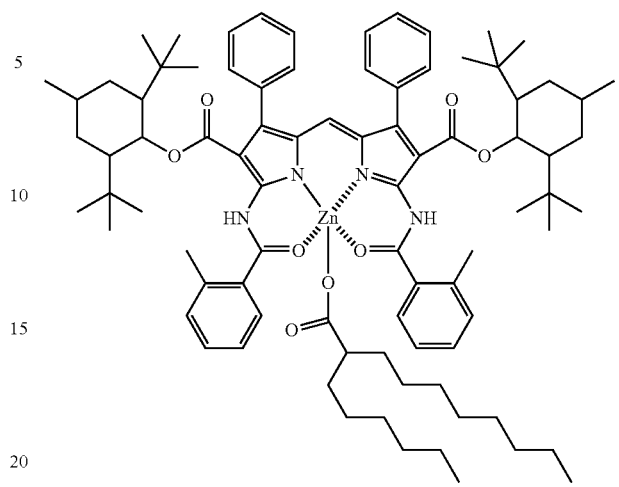

(a-6)
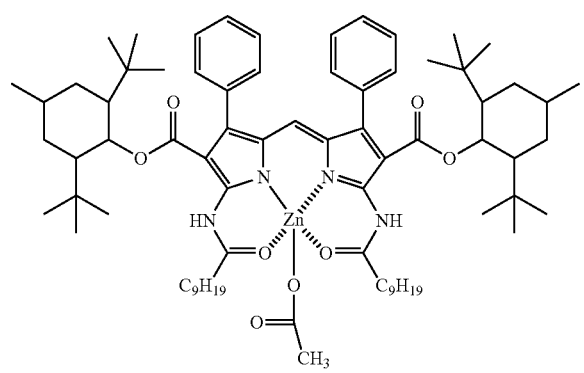
(a-7)
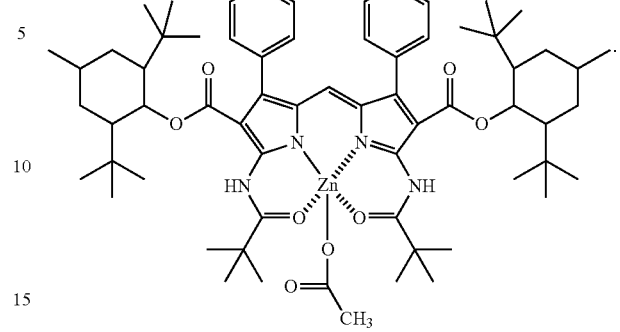
* * * * *